US007055165B2

(12) United States Patent
Connelly

(10) Patent No.: US 7,055,165 B2
(45) Date of Patent: May 30, 2006

(54) METHOD AND APPARATUS FOR PERIODICALLY DELIVERING AN OPTIMAL BATCH BROADCAST SCHEDULE BASED ON DISTRIBUTED CLIENT FEEDBACK

(75) Inventor: Jay H. Connelly, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 409 days.

(21) Appl. No.: 09/882,105

(22) Filed: Jun. 15, 2001

(65) Prior Publication Data

US 2002/0194607 A1 Dec. 19, 2002

(51) Int. Cl.
*H04N 7/173* (2006.01)
*H04N 7/16* (2006.01)
*H04N 9/00* (2006.01)
*G06F 17/60* (2006.01)
*G06F 9/46* (2006.01)

(52) U.S. Cl. ............................ 725/9; 725/105; 725/11; 725/91; 725/92; 725/93; 725/97; 725/86; 705/10; 718/100; 718/101; 718/102; 718/103

(58) Field of Classification Search .......... 725/87–100, 725/9, 13, 14; 709/102, 103; 718/100–103; 705/10
See application file for complete search history.

(56) References Cited

U.S. PATENT DOCUMENTS

| 4,602,279 | A | | 7/1986 | Freeman | |
|---|---|---|---|---|---|
| 5,155,591 | A | | 10/1992 | Wachob | |
| 5,410,344 | A | * | 4/1995 | Graves et al. | 725/46 |
| 5,444,499 | A | | 8/1995 | Saitoh | |
| 5,446,919 | A | | 8/1995 | Wilkins | |
| 5,534,911 | A | * | 7/1996 | Levitan | 725/46 |
| 5,559,549 | A | | 9/1996 | Hendricks et al. | |
| 5,564,088 | A | | 10/1996 | Saitoh | |
| 5,600,364 | A | | 2/1997 | Hendricks et al. | |
| 5,686,954 | A | | 11/1997 | Yoshinobu et al. | |

(Continued)

FOREIGN PATENT DOCUMENTS

WO    WO 99/65237    12/1999

(Continued)

OTHER PUBLICATIONS

Wu, Method for Providing a Personalized Video Channel, Mar. 1, 2001, WO 01/15451 A1.*

(Continued)

*Primary Examiner*—Vivek Srivastava
*Assistant Examiner*—Jason J. Chung
(74) *Attorney, Agent, or Firm*—Blakely, Sokoloff, Taylor & Zafman LLP

(57) ABSTRACT

A method and system for periodically deriving an optimal batch broadcast schedule based on client demand feedback data from a distributed set of broadcast clients. The broadcast system includes an operation center that broadcasts meta-data to a plurality of client systems. The meta-data describes a plurality of pieces of content that are in consideration for upcoming broadcasts by the server. Each client receives the broadcasted meta-data from and sends back a set of client demand feedback data to the operations center, wherein the user feedback data reflects a client's interest level in at least a portion of the pieces of content. The feedback data, which typically may include ratings and/or relative rankings, may be user-generated, automatically-generated, or a combination of the two. The system then send a batch of content based on an aggregation of the feedback data in combination with available broadcast bandwidth and broadcast schedule window.

56 Claims, 21 Drawing Sheets

U.S. PATENT DOCUMENTS

| | | | |
|---|---|---|---|
| 5,751,282 A * | 5/1998 | Girard et al. ............... | 345/721 |
| 5,768,681 A * | 6/1998 | Dan et al. ..................... | 725/95 |
| 5,920,700 A * | 7/1999 | Gordon et al. .............. | 709/226 |
| 5,945,988 A | 8/1999 | Williams et al. | |
| 5,977,964 A | 11/1999 | Williams et al. | |
| 5,991,841 A | 11/1999 | Gafken et al. | |
| 6,002,393 A | 12/1999 | Hite et al. | |
| 6,020,883 A | 2/2000 | Herz et al. | |
| 6,088,722 A | 7/2000 | Herz et al. | |
| 6,114,376 A | 9/2000 | Prichard et al. | |
| 6,119,189 A | 9/2000 | Gafken et al. | |
| 6,131,127 A | 10/2000 | Gafken et al. | |
| 6,144,376 A | 11/2000 | Connelly | |
| 6,184,918 B1 | 2/2001 | Goldschmidt Iki et al. | |
| 6,304,578 B1 * | 10/2001 | Fluss .......................... | 370/413 |
| 6,349,321 B1 * | 2/2002 | Katayama ................... | 709/103 |
| 6,374,405 B1 * | 4/2002 | Willard ....................... | 725/94 |
| 6,378,036 B1 * | 4/2002 | Lerman et al. ............. | 711/112 |
| 2001/0037507 A1 * | 11/2001 | Mori | |

FOREIGN PATENT DOCUMENTS

| | | |
|---|---|---|
| WO | WO 00/01149 | 1/2000 |
| WO | WO 00/64165 | 10/2000 |
| WO | WO 01/15451 A1 | 3/2001 |

OTHER PUBLICATIONS

Intel: Intel Archtecture Labs. Internet and Broadcast: The Key To Digital Convergence. Utilizing Digital Technology to Meet Audience Demand, 2000, pp. 1-4.

Intel: Intel Architecture Labs. Client Infrastructure for Internet-Based Data Services for Digital Television: Enabling A New Class of DTV Services, 2000, pp. 1-10.

Enhanced Digital Broadcast, Web Page [online]. IAL Digital Entertainment [retrieved on Aug. 21, 2001] Retrieved from the Internet: <URL: http//www.developer.intel.com/ial/home/digentertain/edb.htm. pp. 1-3.

Internet Protocol (IP) Multicast Technology Overview. White paper [online]. Cisco System, Inc. Jun. 27, 2001. [retrieved on Jun. 29, 2001] Retrieved from the Internet: <URL: http//www.cisco.com/warp/public/cc/pd/iosw/tech/ipmu_ov.htm pp. 1-16.

"What is Replay TV? Introducing the new ReplayTV 2020". Web Page [online]. ReplayTV [retrieved on Mar. 21, 2000] Retrieved from the Internet: URL<: http//www.replaytv.com/overview/index.htm. p. 1.

"Features. Your Time Your Schedule", Webpage [online]. ReplayTV [retrieved on Mar. 21, 2000] Retrieved from the Internet:<URL: http//www.replaytv.com.overview/features.htm. pp.1-2.

Frequently Asked Questions. Will ReplayTV make me more popular? And other frequently asked questions. ReplayTV, Web Page [online]. [retrieved on Mar. 21, 2000] Retrieved from the internet: <URL: http://www.replaytv.com/overview.faqs.htm pp.1-4.

ReplayTV: Features/Benefits. ReplayTV, Web Page [online]. [retrieved on Mar. 21, 200] Retrieved from the internet<URL: http://www.replaytv.com/overview/details.htm pp. 1-3.

Competitive Differences. ReplayTV, Web Page. [online] [retrieved on Mar. 21, 2000] Retrieved from the Internet<URL: http://www.replaytv.com/overview/differences.htm. pp. 1-2.

Technical Specifications. ReplayTV, Web Page. [online] [retrieved on Mar. 21, 2000] Retrieved from the internet<URL: http://www.replaytv.com/overview/techspecs.htm. p. 1.

Smyth, B. et al, A Personalized Television Listings Service; Communications of the ACM; Aug. 2000, vol. 43, No. 8., pp. 107-111.

A Better Way to WATCH TV. What is TiVo? Web Page. [online] [retrieved on Mar. 21, 2000] Retrieved from the internet<URL: http://www.tivo.com/what/intro.html. p. 1.

Control LIVE TV. What is TiVo? Web Page. [online] [retrieved on Mar. 21, 2000] Retrieved from the internet<URL: http://www.tivo.com/what/intro2.html. p. 1.

Something GOOD is Always On. What is TiVo? Web Page. [online] [retrieved on Mar. 21, 2000] Retrieved from the internet<URL: http://www.tivo.com/what/intro3.html. p. 1.

Channel SURF in a Whole New Way. What is TiVo? Web Page. [online] [retrieved on Mar. 21, 2000] Retrieved from the internet<URL: http://www.tivo.com/what/intro4.html. p. 1.

DIGITAL Recordings without the Tape. What is TiVo? Web Page. [online] [retrieved on Mar. 21, 2000] Retrieved from the internet<URL: http://www.tivo.com/what/intro5.html. p. 1.

What you want, When you Want it.™ What is TiVo? Web Page. [online] [retrieved on Mar. 21, 2000] Retrieved from the internet<URL: http://www.tivo.com/what/how.html. p. 1.

PRODUCT Specifications. What is TiVo? Webpage. [online] [retrieved on Mar. 21, 2000] Retrieved from the internet<URL: http://www.tivo.com/what/how2.html. p. 1.

Frequently asked Questions. Web Page. [online] [retrieved on Mar. 21, 2000] Retrieved from the internet<URL: http://www.tivo.com/what/faq_sub.html. pp. 1-9.

"Program and System Information Protocol for Terrestrial Broadcast and Cable, (Revision A) and Amendment No. 1," Advanced Television Systems Committee, Dec. 23, 1997, 135 pages.

"Digital Video Broadcasting (DVB); Specification for Service Information (SI) in DVB Systems," ETSI EN 300 468, Nov. 2000, 83 pages, vol. 1.4.1 European Broadcasting Union.

Haskell, Barry G. et al., Digital Video: An Introduction to MPEG-2; 1997; pp. 280-283; Chapman & Hall; New York, NY.

Hu, Qinglong et al., "Power Conservative Multi-Attribute Queries On Data Broadcast", Data Engineering, 2000. Proceedings. 16th International Conference on San Diego, CA, USA, Feb. 29-Mar. 3, 2000, Los Alamitos, CA, USA; *IEEE Comput. Soc. US*, (Feb. 29, 2000), pp. 157-177.

* cited by examiner

| NAME | ACTOR | GENRE |
|---|---|---|
| ACTION DUDE | JOE SMITH | ACTION |
| THE FUNNY SHOW | JANE DOE | COMEDY |
| BLAST 'EM | JANE DOE | ACTION |
| HARDY HAR HAR | JOE SMITH | COMEDY |

| ATTRIBUTE | ATTRIBUTE VALUE | RELEVANCE | BELIEVABILITY |
|---|---|---|---|
| ACTOR | JOE SMITH | 0 | 0 |
| ACTOR | JANE DOE | 0 | 0 |
| GENRE | ACTION | 0 | 0 |
| GENRE | COMEDY | 0 | 0 |

| NAME | RATING | RATING TYPE | IN CACHE | NEXT TREATMENT |
|---|---|---|---|---|
| ACTION DUDE | 0 | N/A | YES | N/A |
| THE FUNNY SHOW | 0 | N/A | YES | N/A |
| BLAST 'EM | 0 | N/A | YES | N/A |
| HARDY HAR HAR | 0 | N/A | NO | N/A |

| NAME | CLASSIFICATION |
|---|---|
| ACTION DUDE | RECEIVE |
| THE FUNNY SHOW | REFUSE |
| BLAST 'EM | N/A |
| HARDY HAR HAR | N/A |

| ATTRIBUTE | ATTRIBUTE VALUE | RELEVANCE | BELIEVABILITY |
|---|---|---|---|
| ACTOR | JOE SMITH | 1 | 0 |
| ACTOR | JANE DOE | -1 | 0 |
| GENRE | ACTION | 1 | 0 |
| GENRE | COMEDY | -1 | 0 |

| ATTRIBUTE | ATTRIBUTE VALUE | RELEVANCE | BELIEVABILITY |
|---|---|---|---|
| ACTOR | JOE SMITH | 1 | 1 |
| ACTOR | JANE DOE | -1 | 0 |
| GENRE | ACTION | 1 | 1 |
| GENRE | COMEDY | -1 | 0 |

| NAME | RATING | RATING TYPE | IN CACHE | NEXT TREATMENT |
|---|---|---|---|---|
| ACTION DUDE | 1 | EXPLICIT | YES | REPLACE |
| THE FUNNY SHOW | 0 | EXPLICIT | YES | REPLACE |
| BLAST 'EM | 0.5 | IMPLICIT | YES | KEEP |
| HARDY HAR HAR | 0.5 | IMPLICIT | NO | CAPTURE |

| ATTRIBUTE | ATTRIBUTE VALUE | RELEVANCE | BELIEVABILITY |
|---|---|---|---|
| ACTOR | JOE SMITH | 1 | 1 |
| ACTOR | JANE DOE | -1 | -1 |
| GENRE | ACTION | 2 | 2 |
| GENRE | COMEDY | -1 | 0 |

METHOD AND APPARATUS FOR PERIODICALLY DELIVERING AN OPTIMAL BATCH BROADCAST SCHEDULE BASED ON DISTRIBUTED CLIENT FEEDBACK

BACKGROUND OF THE INVENTION

1. Field of the Invention

The present invention relates generally to broadcast systems and, more specifically, the present invention relates to delivering content using a batch delivery mechanism based on demand feedback data provided by various clients that are distributed across a broadcast area.

2. Background Information

Broadcast systems traditionally transmit data in one direction from a broadcasting source, such as an antenna, satellite or a computer server system to a plurality of broadcast consumers, who typically receive the broadcast data using television receivers, cable boxes, set-top boxes, or client computers. For the purposes used herein, the broadcasting source will be referred to as a "server system," or "broadcast server" and the broadcast consumers (i.e., users) are referred to as "clients" who receive content via "client systems." Users of the client systems typically consume the signals received from the server system as they are broadcast. For example, broadcast signals corresponding to a live event are received substantially in real time. The same is true for other types of broadcast content, such as pre-recorded television shows and movies. Unlike live events, the data corresponding to prerecorded shows and movies is stored somewhere in the broadcast system in advance.

Presently, a common content-delivery broadcasting method in which client end-users are provided with content involves server systems that broadcast the same data continuously and/or at staggered intervals. Thus, if a user desires to consume a particular piece of content, such as a movie or television show, the user "tunes in" to one of the repeated broadcasts of the content at the time the broadcast occurs. One example of this paradigm can be illustrated with present day "pay per view" movies that are available from cable or satellite television providers. For instance, cable television providers commonly broadcast the same movies repeatedly on multiple channels at staggered intervals. Users that wish to watch a particular movie simply tune in to one of the channels on which the desired movie is broadcast at the beginning of one of the times that the movie is broadcast. The continuous and repeated broadcasts of the same data or programs results in a very inefficient use of broadcast bandwidth. Bandwidth used to broadcast the same data repeatedly on multiple channels could otherwise be used to broadcast different data.

Another paradigm for providing content in a broadcast system involves a user recording a particular data file and later accessing the data file "on demand." Continuing with the television broadcast illustration discussed above, an example of this paradigm is a user setting up his or her video cassette recorder (VCR) to record a desired television program. Later, when the user wishes to watch the television program "on demand," the user simply plays the earlier recorded program from his or her VCR. Recently, more advanced digital video recorders have become available, which record the television broadcasts on internal hard drives instead of the video cassette tapes used by traditional VCRs. However, use of the digital video recorders is similar to traditional VCRs in that the users are required to explicitly set the criteria used (e.g. date, time) to determine which broadcasts are recorded on the internal hard drives.

Another limitation with present day broadcast systems is that it is difficult for most users of the client systems to provide feedback to broadcasters with regard to programming. For example, continuing with the television broadcast illustration discussed above, many of today's television broadcasters rely upon Neilson ratings to determine broadcast programming and/or scheduling. Neilson ratings are generally based upon only a small sampling of a cross-section of the public, and they typically measure only the share (estimated percentage of users watching a given television show vs. all television shows at the time a show is broadcast) and audience (estimated total number of people watching at least a portion of a given show. Consequently, most television viewers have relatively little or no impact on broadcast schedules and/or content.

BRIEF DESCRIPTION OF THE DRAWINGS

The present invention is illustrated by way of example and not limitation in the accompanying figures, wherein.

FIG. 6 is an illustration of one example of meta-data broadcast by a server to describe a in accordance with the teachings of the present invention.

FIG. 7 is an illustration of one example of a meta-data table updated and maintained by a client in accordance with the teachings of the present invention.

FIG. 8 is an illustration of one example of a content rating table updated and maintained by a client in accordance with the teachings of the present invention.

FIG. 9 is diagram an illustrating one embodiment of data files that are classified by a user in accordance with the teachings of the present invention.

FIG. 10 is diagram illustrating one embodiment of a meta-data table that is updated in response to user classifications in accordance with the teachings of the present invention.

FIG. 11 is diagram illustrating one embodiment of a meta-data table that is updated after a user access in accordance with the teachings of the present invention.

FIG. 12 is diagram illustrating one embodiment of a content rating table that is updated after a user access in accordance with the teachings of the present invention.

FIG. 13 is diagram illustrating another embodiment of a meta-data table that is updated after another user access in accordance with the teachings of the present invention.

DETAILED DESCRIPTION

In one aspect of the present invention, signaling methods and apparatuses for providing content via a broadcast system based on client feedback information are disclosed. In another aspect of the present invention, methods and apparatuses are disclosed for rating and ranking content from among various pieces of content that are in consideration to be broadcast during an upcoming broadcast window are disclosed. In yet another aspect of the present invention, methods and apparatuses for dynamically determining the broadcast content and/or schedule of a broadcast operation center are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Figure 1A:
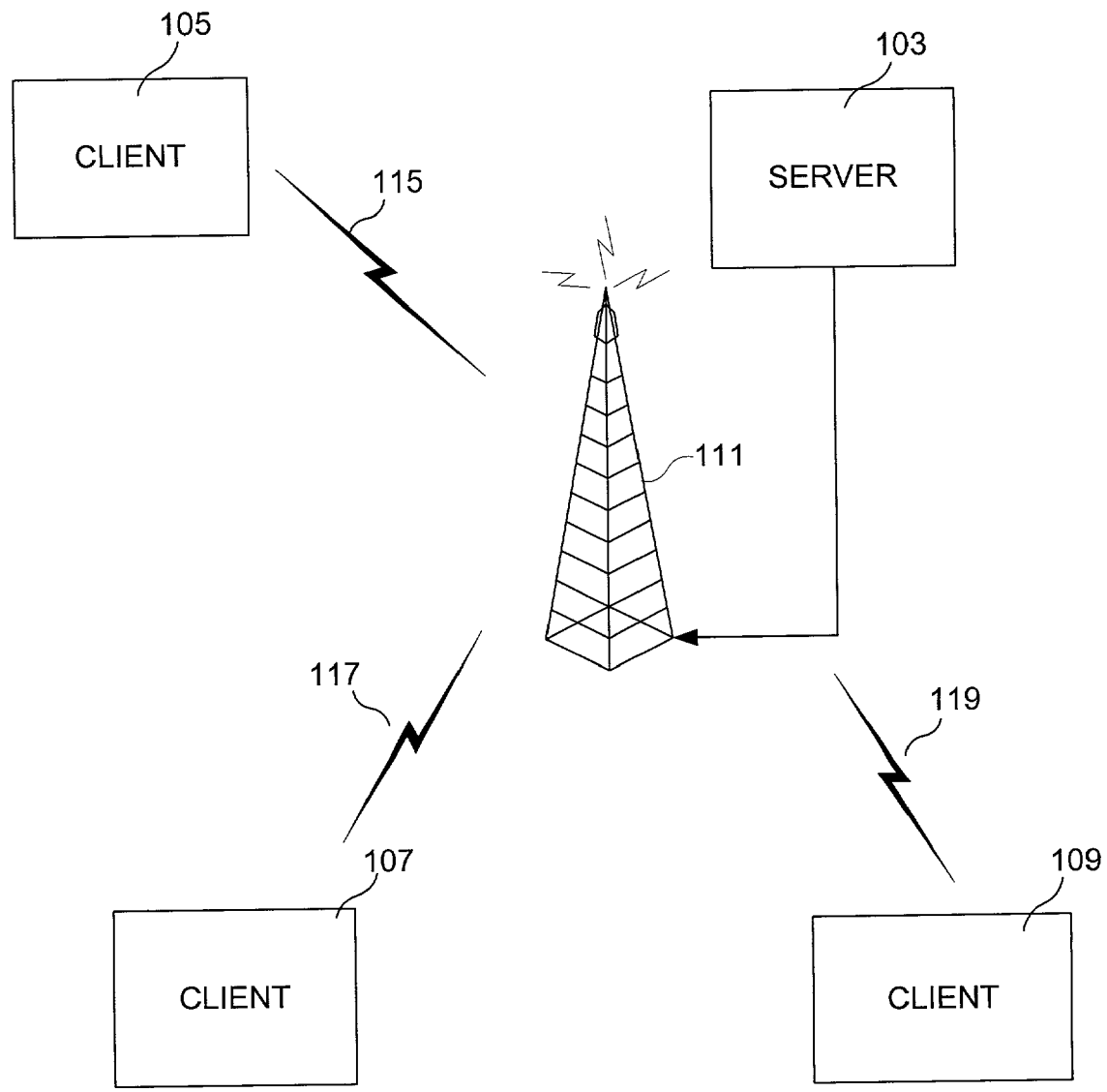
FIG. 1A is a block schematic diagram illustrating one embodiment of a broadcast system in accordance with the teachings of the present invention in which a broadcast server broadcasts various data to a plurality of client systems;.

FIG. 1A is an illustration of one embodiment of a broadcast system in accordance with the teachings of the present invention. As illustrated in the depicted embodiment, a broadcast server 103 is configured to broadcast information to a plurality of client systems 105, 107 and 109. In the embodiment shown in FIG. 1A, client system 105 receives a broadcast from broadcast server 103 through a broadcast link 115 from a broadcast antenna 111. Similarly, client system 107 receives a broadcast from broadcast server 103 through a broadcast link 117 and client system 109 receives a broadcast from broadcast server 103 through a broadcast link 119 from broadcast antenna 111. In one embodiment, broadcast links 115, 117 and 119 are unidirectional wireless radio frequency (RF) links from broadcast antenna in a format such as for example, but not limited to known amplitude modulation (AM) or frequency modulation (FM) radio signals, television (TV) signals, digital video broadcast (DVB) signals or the like, which are broadcast through the atmosphere.

In one embodiment, broadcast server 103 is configured to broadcast a plurality of data files, which may be received by client systems 105, 107 and 109. In one embodiment, the data files may be any combination of a number of different types of files including for example video, audio, graphics, text, multi-media or the like. For purposes of explanation, many of the examples provided in this disclosure to help describe the present invention assume that the data files to be broadcast by the server are audio/video files, such as for example movies with moving images and sound, which are termed "pieces of content" herein. However, it will be appreciated that the data files broadcast in accordance with the teachings of the present invention are not limited only to audio/video files.

Figure 1B:
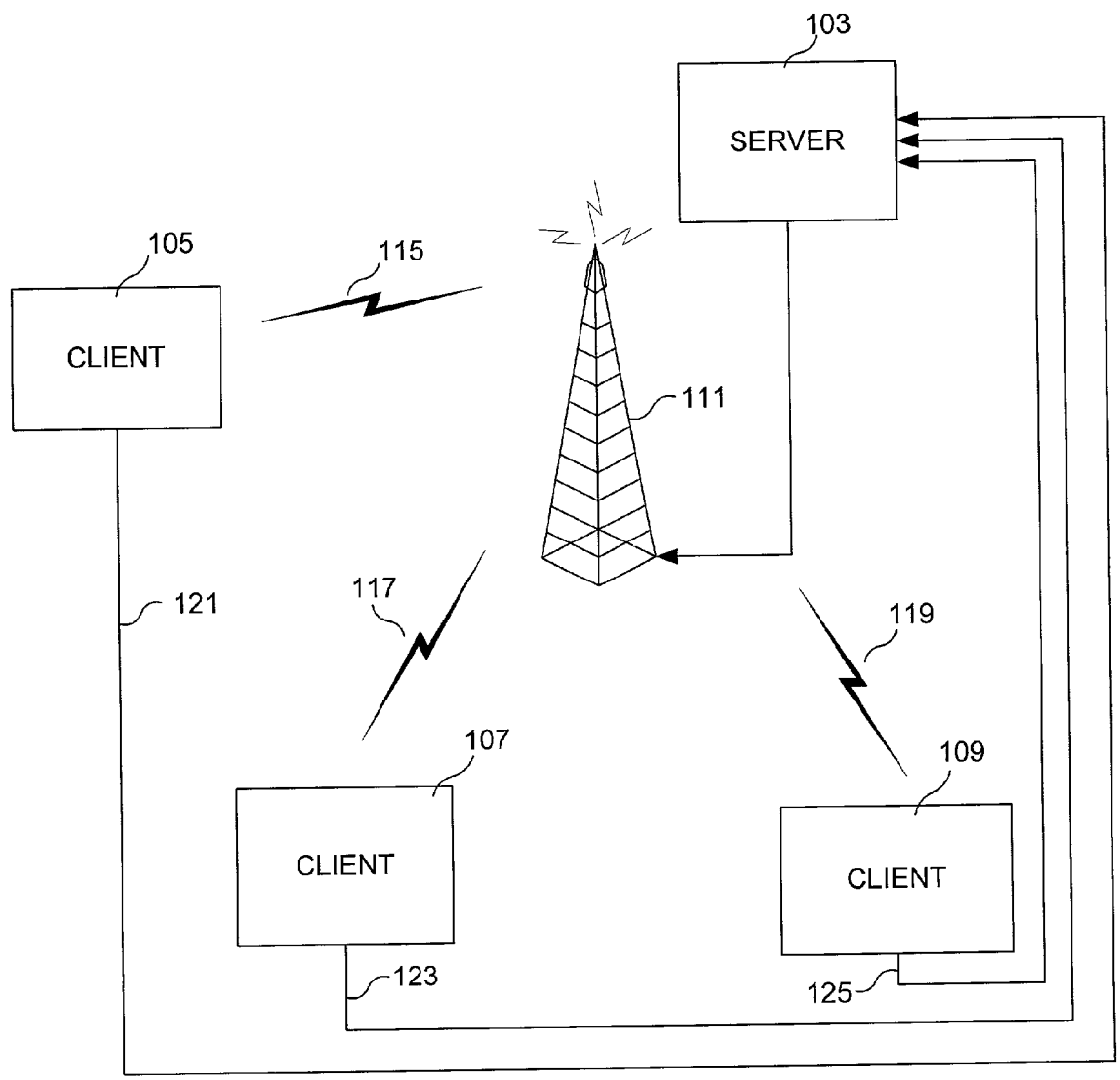
FIG. 1B is a block schematic diagram illustrating another embodiment of a broadcast system in accordance with the teachings of the present invention in which back channel communications links enable client systems to send data back to a broadcast server.

As illustrated in the embodiment shown FIG. 1A, the broadcast links 115, 117, and 119 comprise is a one-way or unidirectional communication links between broadcast server 103 and client systems 105, 107 and 109. However, in another embodiment, it is appreciated that there may also be a second communications link between each client system 105, 107 and 109 and broadcast server 103, respectively. In particular, FIG. 1B is an illustration of the broadcast system of FIG. 1A with the addition of a "back channel" or communications link between each of client systems 105, 107 and 109 and broadcast server 103. In particular, the embodiment illustrated in FIG. 1B shows communication links 121, 123 and 125, which may be used by client systems 105, 107 and 109, respectively, to send information back to broadcast server 103. Although communication links 121, 123 and 125 are illustrated in FIG. 1B as direct links between client systems 105, 107 and 109 and broadcast server 103, it is appreciated that client systems 105, 107 and 109 may communicate information to broadcast server 103 through indirect links such as for example but not limited to broadcasted wireless signals, network communications or the like.

Figure 1C:
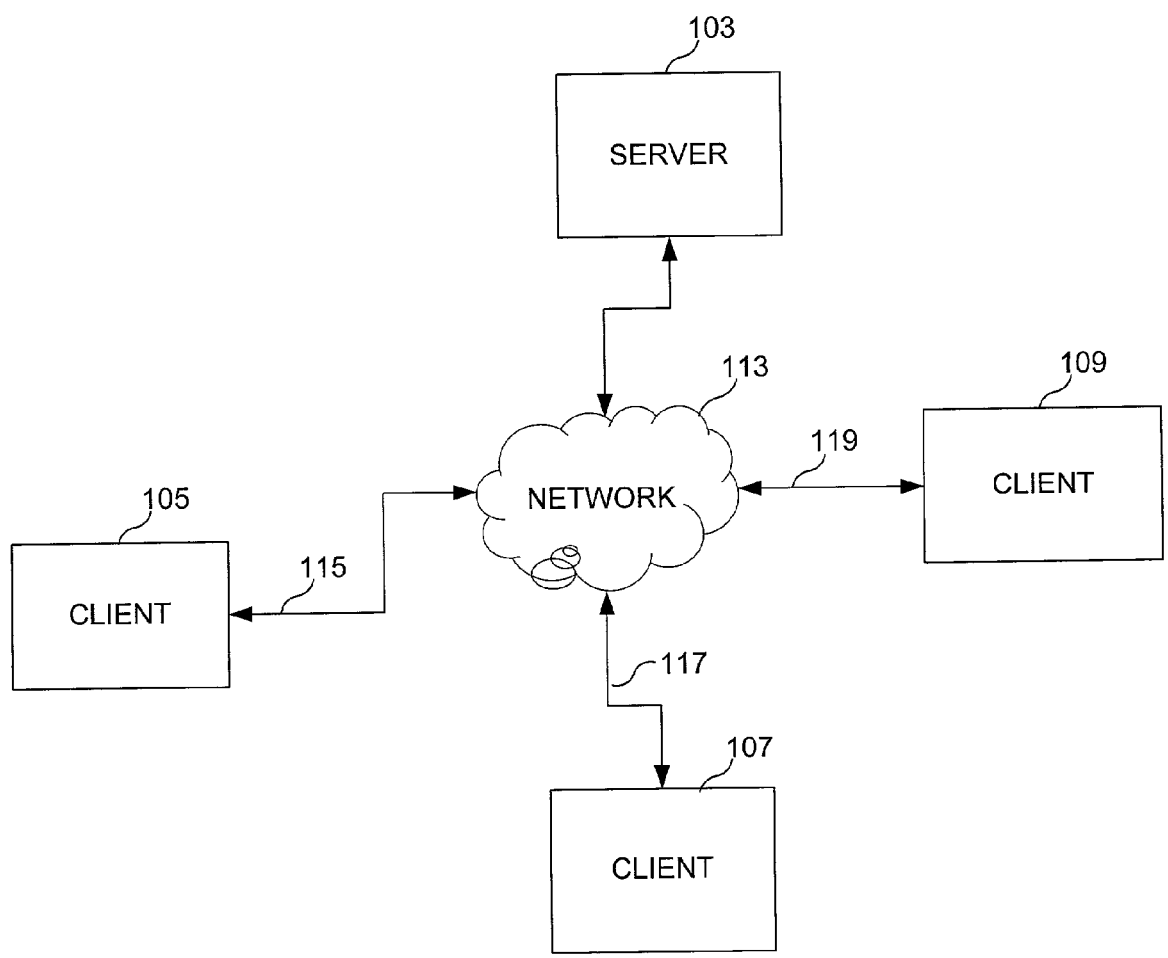
FIG. 1C is a block schematic diagram illustrating yet another embodiment of a broadcast system in accordance with the teachings of the present invention in which the a broadcast server and various client systems are enabled to communication via a computer network;.

FIG. 1C is an illustration of yet another embodiment of a broadcast system in accordance with the teachings of the present invention. As shown, broadcast server 103 is coupled to broadcast information to a plurality of client systems 105, 107 and 109 over a network 113. In one embodiment, network 113 may be any type of communications network through which a plurality of different devices may communicate, such as the Internet, a wide area network (WAN), a local area network (LAN), an intranet, or the like.

In the embodiment illustrated in FIG. 1C, client system 105 is coupled to receive information broadcast from broadcast server 103 through broadcast link 115. Similarly, client system 107 is coupled to receive information broadcast from broadcast server 103 through broadcast link 117 and client system 109 coupled to receive information broadcast from broadcast server 103 through broadcast link 119. It is noted that in the embodiment illustrated in FIG. 1C, broadcast links 115, 117 and 119 are shown as bi-directional links from network 113 to client systems 105, 107 and 109, which enable client systems 105, 107 and 109 to send information to broadcast server 103.

Figure 2:
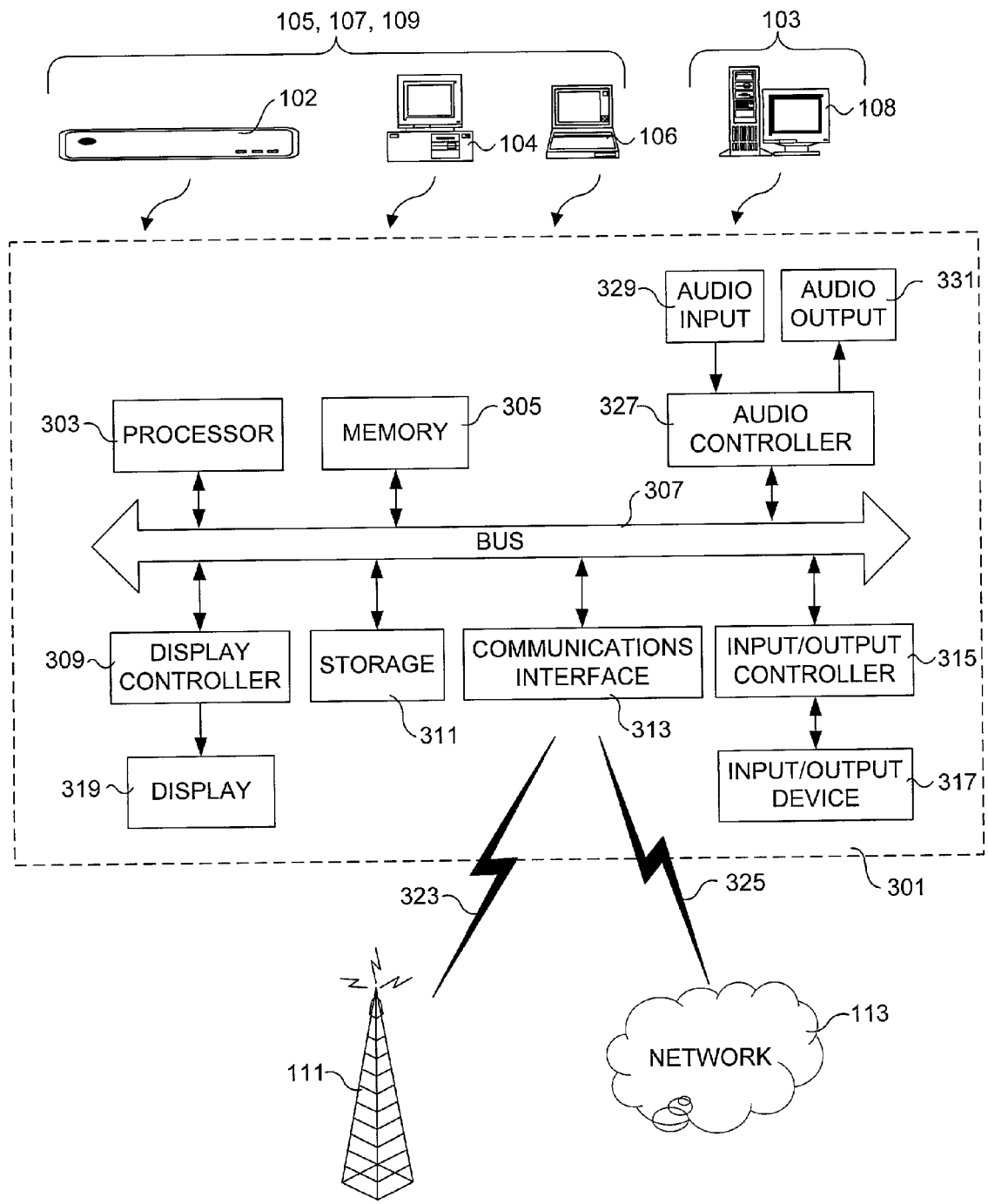
FIG. 2 is a block schematic diagram of one embodiment of a computer system representative of a client system or a server in accordance with the teachings of the present invention.

FIG. 2 is a block diagram illustrating one embodiment of a machine 301 that may be used for the broadcast server 103, or client systems 103, 105 or 107 in accordance with the teachings of the present invention. Typically, client systems 103, 105, and 107 may use various types of machines, including a set-top box 102, desktop computer or workstation 104, and laptop computer 106. The machine used for server 103 will typically comprise a computer server 108 or similar type of server hardware that is designed to broadcast data to a plurality of clients. In one embodiment, machine 301 is a computer or a set top box that includes a processor 303 coupled to a bus 307. In one embodiment, memory 305, storage 311, display controller 309, communications interface 313, input/output controller 315 and audio controller 327 are also coupled to bus 307.

In one embodiment, machine 301 interfaces to external systems through communications interface 313. Communications interface 313 may include a radio transceiver compatible with AM, FM, TV, digital TV, DVB, wireless telephone signals or the like. Communications interface 313 may also include an analog modem, Integrated Services Digital Network (ISDN) modem, cable modem, Digital Subscriber Line (DSL) modem, a T-1 line interface, a T-3 line interface, an optical carrier interface (e.g. OC-3), token ring interface, satellite transmission interface, a wireless interface or other interfaces for coupling a device to other devices.

In one embodiment, a carrier wave signal 323 is received by communications interface 313 to communicate with antenna 111. In one embodiment, carrier wave signal 325 is received/transmitted between communications interface 313 and network 113. In one embodiment, a communications signal 325 may be used to interface machine 301 with another computer system, a network hub, router or the like. In one embodiment, carrier wave signals 323 and 325 are considered to be machine readable media, which may be transmitted through wires, cables, optical fibers or through the atmosphere, or the like.

In one embodiment, processor 303 may be a conventional microprocessor, such as for example but not limited to an Intel x86 or Pentium family microprocessor, a Motorola family microprocessor, or the like. Memory 305 may be a machine readable medium such as dynamic random access memory (DRAM) and may include static random access memory (SRAM). Display controller 309 controls in a conventional manner a display 319, which in one embodiment may be a cathode ray tube (CRT), a liquid crystal display (LCD), an active matrix display, a television monitor or the like. The input/output device 317 coupled to input/output controller 315 may be a keyboard, disk drive, printer, scanner and other input and output devices, including a television remote, mouse, trackball, trackpad, joystick, or the like. In one embodiment, audio controller 327 controls in a conventional manner audio output 331, which may include for example audio speakers, headphones, an audio receiver, amplifier or the like. In one embodiment, controller also controls in a conventional manner audio input 329, which may include for example a microphone or input(s) from an audio or musical device, or the like.

Storage 311 in one embodiment may include machine-readable media such as for example but not limited to a magnetic hard disk, a floppy disk, an optical disk, a read-only memory (ROM) component, a smart card or another form of storage for data. In one embodiment, storage 311 may include removable media, read-only media, readable/writable media or the like. Some of the data may be written by a direct memory access process into memory 305 during execution of software in computer system 301. It is appreciated that software may reside in storage 311, memory 305 or may be transmitted or received via modem or communications interface 313. For the purposes of the specification, the term "machine readable medium" shall be taken to include any medium that is capable of storing data, information or encoding a sequence of instructions for execution by processor 303 to cause processor 303 to perform the methodologies of the present invention. The term "machine readable medium" shall be taken to include, but is not limited to solid-state memories, optical and magnetic disks, carrier wave signals, and the like.

In one embodiment, a broadcast system, such as for example one similar to any of those illustrated in FIGS. 1A–1C, is configured to have a broadcast server 103 broadcast a plurality of data files to a plurality of client system 105, 107 and 109. As will be discussed in greater detail below, each of the plurality of data files corresponds to a respective piece of content that is described with meta-data in accordance with teachings of one embodiment of the present invention. In general, meta-data can be considered as a set of descriptors or attribute values that describe content or data files to be broadcast or potentially broadcast from server 103. The meta-data of the present invention provides information that enables client systems 105, 107 and 109 to reason and make informed decisions regarding the content of data files to be broadcast later by broadcast server 103. As will be discussed, various embodiments of the present invention utilize the meta-data for client-side filtering, storage management and other personalization techniques as well as determine broadcast schedules and content of upcoming server broadcasts.

The present invention addresses many of the inadequacies in the prior art relating to the broadcasting of undesired content by providing a method and system that broadcasts content based on client demand feedback information. The invention defines a mechanism for generating optimized broadcast schedules whereby content description information corresponding to various pieces of content (e.g., movies, pre-recorded and live TV shows, etc.) that are in consideration for broadcast by a broadcast operations center is periodically broadcast to client systems, whereupon the client systems rate and/or rank the pieces of content using either user feedback, automatic feedback based on a user's previous viewing habits and other considerations, or a combination of the two. Demand feedback data from the client systems are then forwarded back to the broadcast operations center, which then generates or updates broadcast schedule queue comprising an ordered list of content to be broadcast based, at least in part, on the demand feedback information received from the client systems. Based on their placement in the broadcast schedule queue, pieces of content are then broadcast to the client systems, whereupon the client systems can selectively determine which, if any of the pieces of content that are broadcast should be cached by that client system for subsequent "on demand" viewing. In one embodiment, this process is repeated continuously, enabling the broadcast operations center to optimize its broadcast schedule based on client demand feedback rather that having to use a conventional predetermined broadcast schedule.

Figure 3:
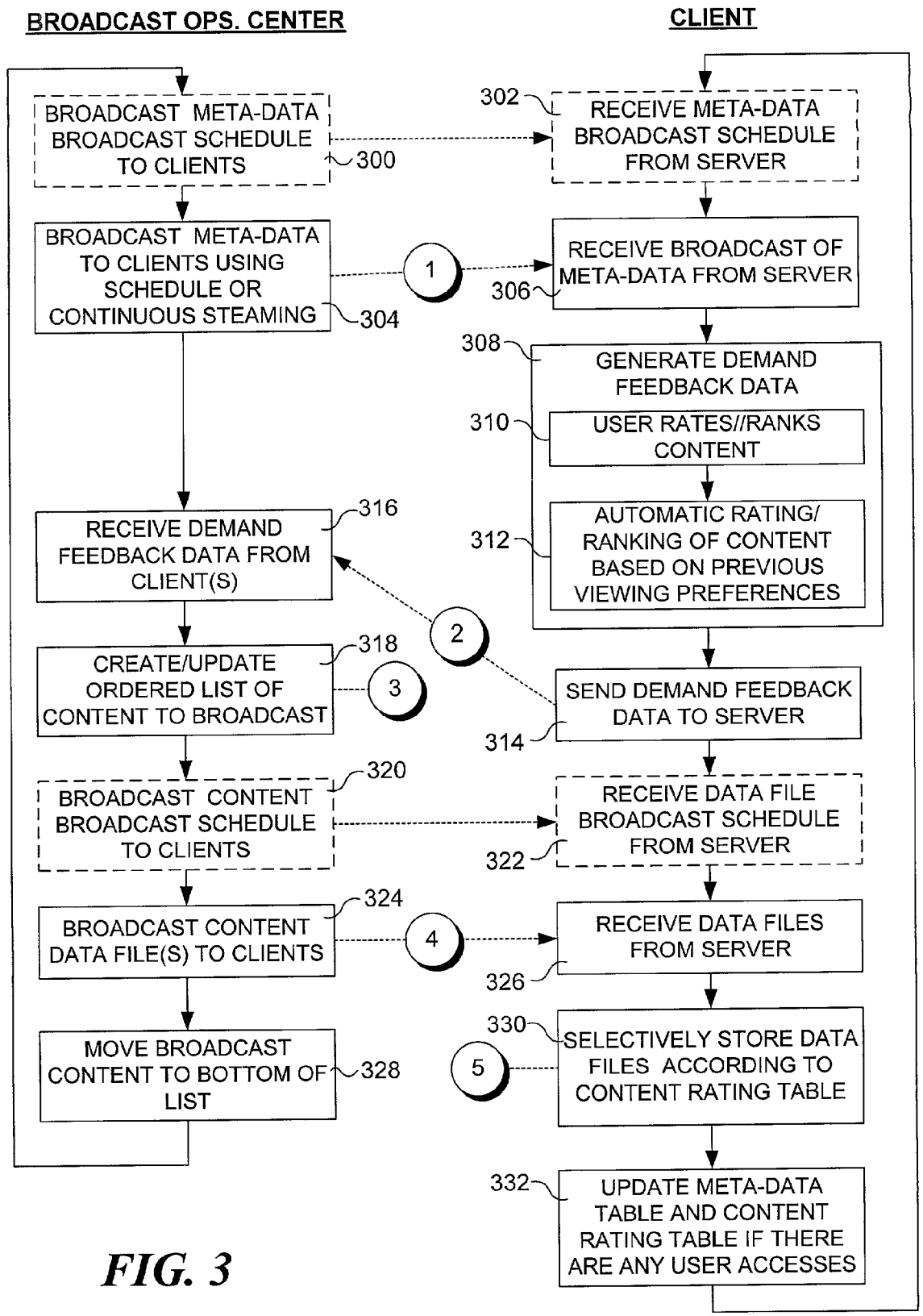
FIG. 3 is a flow diagram illustrating one embodiment of the flow of events in a broadcast server and a client system when broadcasting and processing meta-data and data files in accordance with the teachings of the present invention.

A flowchart corresponding to an exemplary implementation of the invention is FIG. 3. As discussed above, the first task is to provide content description information to the various client systems that may be operated by users who may desire to view content provided by the broadcast operations center. In one embodiment, the content description information is sent as meta-data comprising a set of content descriptors for each piece of content that is considered for the broadcast schedule. In general, the content descriptors may be sent as a continuous stream that the client systems can tap into at any point in time to capture the content description information. As necessary, the content descriptor stream may be preceded by an announcement of where the stream is (e.g., what channel(s) it is broadcast on) and how to locate it. The content descriptor meta-data may also be sent as a file on a periodic basis. In one embodiment, a trigger may be sent to signal the client systems that the content description file is about to be sent so those client systems can receive and store the content descriptor metadata.

Figure 4A:
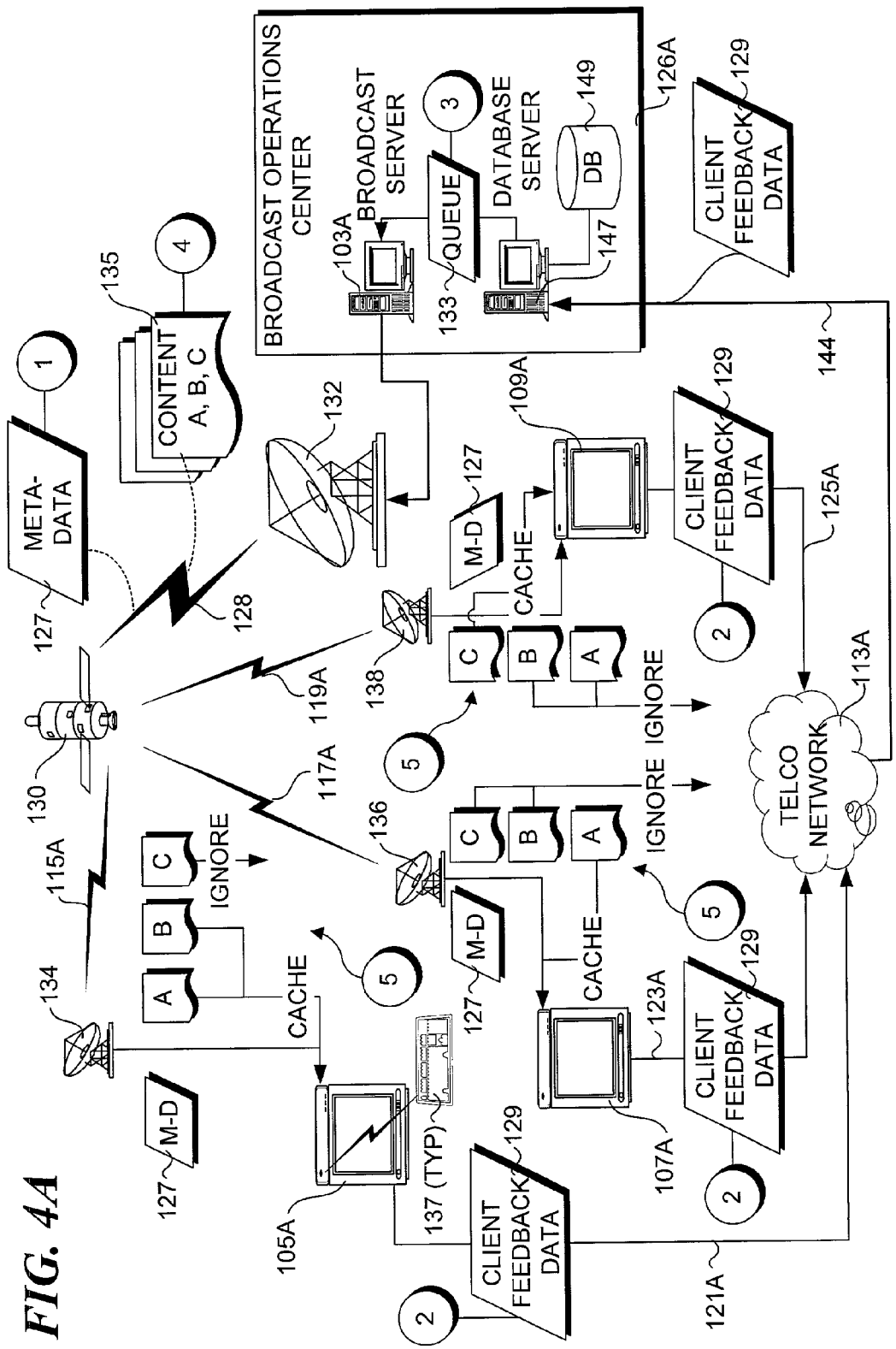
FIG. 4A is a schematic diagram illustrating a first broadcast system implementation of the present invention is which meta-data and content is broadcast via a satellite network to a plurality of client systems and client demand feedback data is sent back from the client systems via telecommunications links.

As illustrated by a block 301, in one embodiment, a meta-data broadcast schedule is broadcast to the client systems over an appropriate broadcast link. For example, the client systems may comprise set-top boxes and the broadcast links may comprise satellite television links, as illustrated in FIG. 4A. In this instance, a broadcast server 103A operated by a broadcast operations center 126A sends an uplink signal 128 to a satellite 130 via a ground station 132. Satellite 130 then broadcasts the meta-data broadcast schedule to client systems 103A, 105A, and 107A via radio frequency (RF) links 115A, 117A, and 119A, which are formed by RF transmission of data from the satellite to respective antennas 134, 136, and 138. Generally, satellite 130 functions as a multi-channel transponder, which sends out data streams using predetermine radio frequency bands, wherein each band corresponds to a respective channel. In one embodiment, a selected channel may be used to send this meta-data broadcast schedule data. In another embodiment, unused portions of a selected channel or multiplexed channels may be used to send the schedule data, as described in further detail below.

Figure 4B:
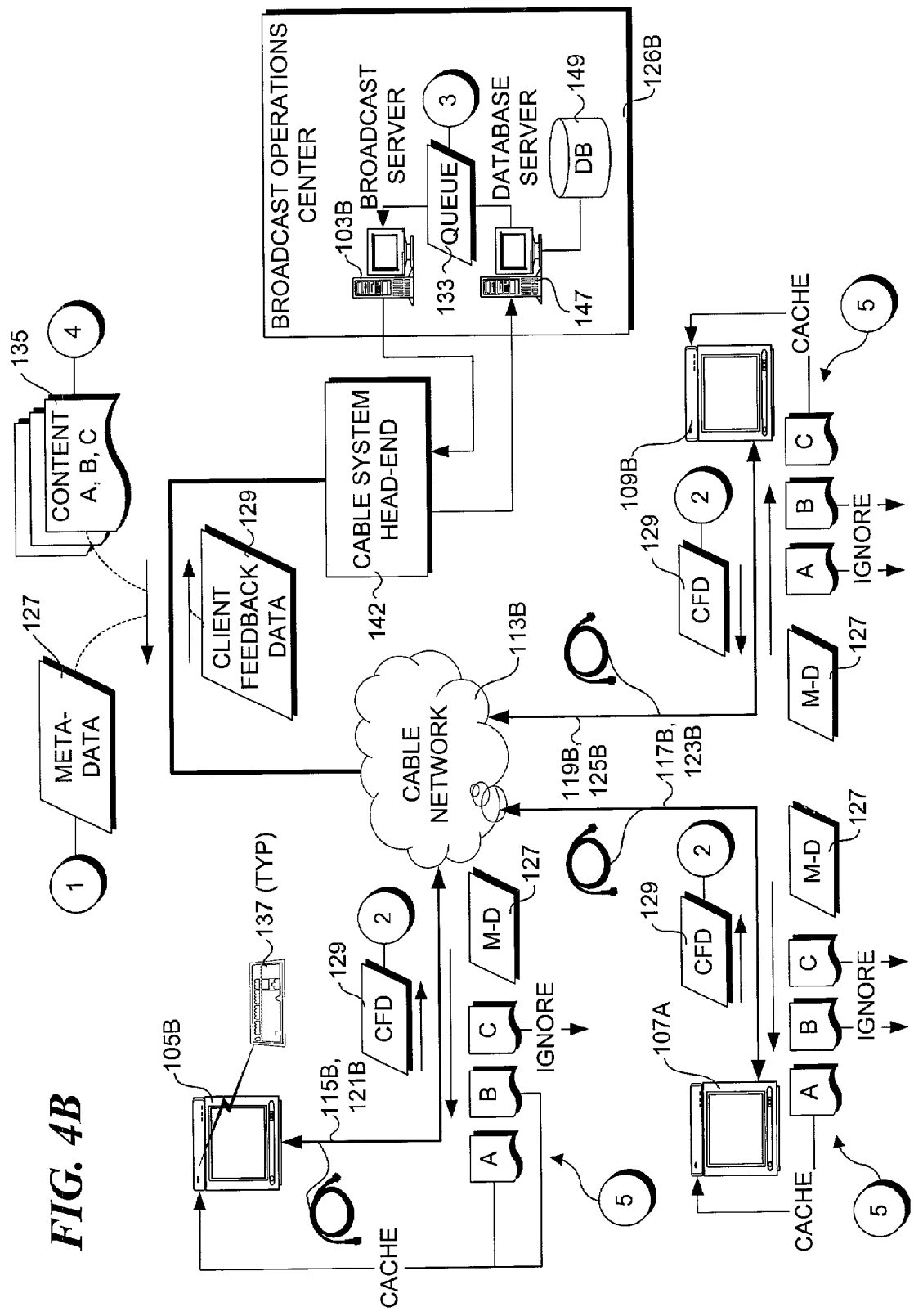
FIG. 4B is a schematic diagram illustrating a second broadcast system implementation of the present invention is which meta-data and content is broadcast to a plurality of client systems and client demand feedback data is sent back from the client systems via a bi-directional cable network.

As discussed above, in addition to broadcasting content via satellite RF links, content may be broadcast over various networks, such as cable systems and computer networks. An exemplary system for implementing the invention using a bi-directional cable system is shown in FIG. 4B. In this system, a broadcast server 103B operated by a broadcast operations center 126B submits broadcast data, such as the meta-data broadcast schedule, to a cable system head-end 142. The cable system head-end provides the broadcasting functionality for the cable system, enabling data to be broadcast to set-top box client systems 115B, 117B, and 119B via a cable network 113B and respective bi-directional cable links 115B, 117B, and 119B.

Figure 4C:
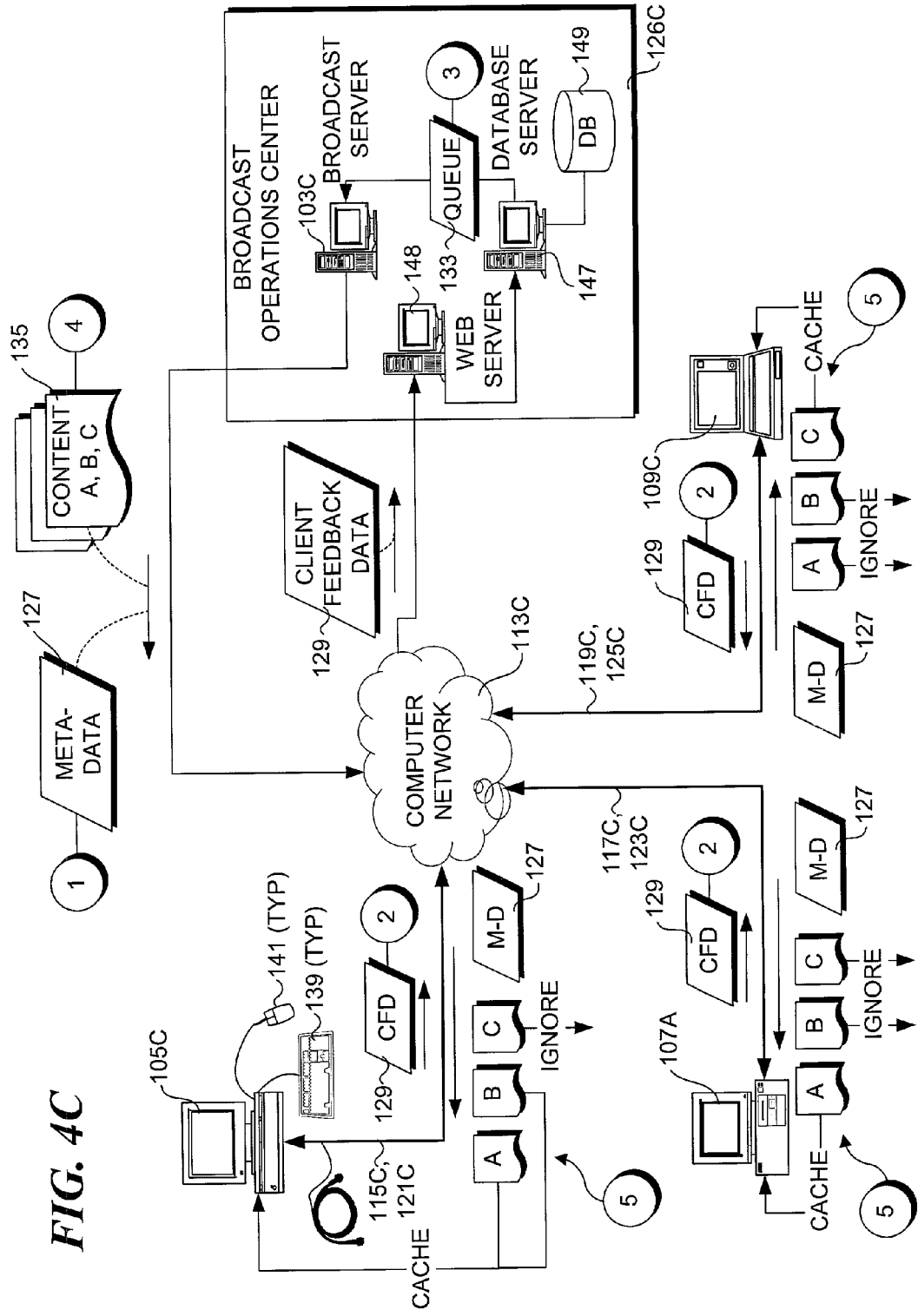
FIG. 4C is a schematic diagram illustrating a third broadcast system implementation of the present invention is which meta-data and content is broadcast to a plurality of client systems and client demand feedback data is sent back from the client systems via a computer network.

An exemplary system for implementing the invention wherein broadcast and client feedback data are transmitted via a computer network is shown in FIG. 4C. In this embodiment, a broadcast server 103C operated by a broadcast operations center 126C broadcasts data using a common network protocol, such as UDP or TCP/EP, or one of various emerging computer netowork broadcast protocols, over a computer network 113C to computer client systems 105C, 107C, and 109C via network links 115C, 117C, and 119C.

In one embodiment, the meta-data broadcast schedule indicates some point in the future when the actual meta-data of the present invention is going to be broadcast by the broadcast server. In one embodiment, the client systems use known ports such as, those used in the program and system information protocol (PSIP), DVB, service advertising protocol (SAP), or the like, to listen for upcoming service announcements from the broadcast server.

In one embodiment, each client $105x$, $107x$ and $109x$ (wherein $105"x"$ includes 105A, 105B, and 105C, etc.) contains a known scheduling service, which accepts requests to wake up, or be activated, at a specific time to receive the information broadcast by the broadcast server $103x$. This scheduling service enables the client systems to wake up at a specified time and select a specified service. For example, in one embodiment, this selection process can be accomplished by tuning to a specific frequency, such as for example in an Advanced Television Systems Committee (ATSC) or a DVB transponder or the like. In one embodiment, the selection process or can be based on a set of data, such as for example multi-cast internet protocol (IP) addresses, which define a service.

In one embodiment, a client application registers with the client signaling system to receive signals from a specific content provider. The client signaling system maintains a table of applications associated with specific content providers. In one embodiment, information from the broadcast server is broadcast over known addresses such that each client can use the known address.

Returning to the flowchart of FIG. 3, in a block 304 the client receives the meta-data broadcast schedule from the broadcast server. In one embodiment, client systems $105x$, $107x$ and $109x$ capture and process this pre-broadcast information in order to determine when to wake-up and receive content, where to receive the content and which content to receive. In one embodiment, when the meta-data broadcast schedule is received by a client system, the registered application in the client system is notified to receive the meta-data broadcast schedule.

In alternative embodiments, the meta-data itself is broadcast continuously as a stream that the client systems can tap into at any point in time. Accordingly, in these embodiments the operations performed by blocks 300 and 302 are not required, as indicated by the dashed outlines for these block (indicating they are optional). Preferably, when streaming embodiments are used, the meta-data stream will include a marker signal to indicate a start point for the current set of meta-data such that a client system only needs to listen for meta-data for a period during which two marker signals are received (guaranteeing that a complete set of the current meta-data has been received). Optionally, the client systems may keep track of the individual content descriptors as the occur in the stream, whereby the client systems will know they have received a complete set of meta-data when they encounter a content descriptor they have previously received.

In a block 304, meta-data 127 (see FIGS. 4A–C) is broadcast from the broadcast server to the client systems at the time specified in the meta-data broadcast schedule or using continuous streaming. In one embodiment, the clients wake-up at the pre-specified time indicated in the meta-data broadcast schedule to receive meta-data 127 from the server. In a block 306 the client systems receive the broadcast of meta-data from the broadcast server. As will be discussed, the meta-data includes descriptions of a plurality of data files that will be broadcast or potentially broadcast later by the server system. At this point, the first task of providing meta-data to the client systems, as indicated by an encircled "1" in FIGS. 3 and 4A–4C is completed.

As provided by a block 308, upon receiving meta-data 127, the client systems rate and/or rank the pieces of content corresponding to the meta-data to provide client demand feedback data back to the broadcast operations center indicating which pieces of content a user(s) of a given client system would like to have broadcast such that those pieces of content may be captured and cached on the client system for "on demand" viewing by the user(s) of those client systems. There are three methods by which the client systems can produce the client demand feedback data. In one embodiment, the user(s) of the client systems may manually rate or provide relative rankings for the pieces of content described by a current set of meta-data, providing an explicit indication of what they would like to have broadcast. This process is provided by a block 310 in the flowchart and described in further detail below. In another embodiment, rating and or relative rankings data is automatically generated by the client system in a block 312, based on, at least in part, previous viewing preferences of the users. This process is also described in further detail below. In a third embodiment, the client demand feedback data comprises a combination of user- and client system-generated ratings and/or rankings data.

In a block 314, the client system sends its demand feedback data back to the server, which receives the data in a block 316. The demand feedback data is indicated as "CLIENT FEEDBACK DATA" 129 or "CFD" 129 in FIGS. 4A–C, and the process of sending the demand feedback data back to the broadcast operations center is indicated by an encircled "2" in FIGS. 3 and 4A–4C. In one embodiment, each client in the broadcast network sends demand feedback data corresponding to all of the pieces of content that are described by a current set of meta-data 127 broadcast earlier from broadcast server 103x. Alternatively, each client system sends all or part of a content rating/ranking table maintained on the client system, described in further detail below.

Depending on the broadcasting system used, there are several different types of communication links that may be used to provide client demand feedback data back to the broadcast operations center. As discussed above with reference to FIG. 1B, each of clients 105, 107, and 109 is provided with a "back channel" communications link, respectively indicated by communication links 121, 123, and 125. In the case of a conventional satellite television broadcast system, such as shown in FIG. 4A, there is only a uni-directional link between the satellite(s) and the receiving antennas. As a result, the communication link back to the broadcast operations center in these systems will typically involve some form of telecommunications (Telco) link, as indicated by links 121A, 123A, and 125, from the clients, which are connected to broadcast operations center 126A via a Telco network 113A and a network link 144. It will be understood that future satellite broadcast systems may provide bi-directional communication links, whereby the client demand feedback data can be sent back to the broadcast operations center using a transceiver antenna. This type of communications technology may likely be similar to today's VSAT (Very Small Aperture Terminal) technology, which provides bi-directional satellite communication capabilities to users of VSAT systems.

In instances in which bi-directional cable broadcast systems are used, as shown in FIG. 4B, the same communications link for a given client system may be used for both receiving broadcast data and for sending client demand feedback data back to broadcast operations center 126B. Similarly, when a computer network broadcast infrastructure is used, such as depicted in FIG. 4C, the same links can be used for receiving broadcast data and sending client demand feedback data back to broadcast operations center 126C. It is noted that in computer networks, the actual "links" may be dynamic, wherein data packets are sent between endpoints, such as between a client system and a server, using dynamic routing. However, for illustrative purposes, these links are depicted as solid lines in FIG. 4C.

Upon receiving client demand feedback data 129, the broadcast operations center creates or updates a broadcast schedule queue 133 comprising a list of the pieces of content that is ordered, at least in part, by aggregating the client demand feedback data, wherein the pieces of content with the highest demand are placed toward the top of the list. This process is indicated by an encircled "3" in FIGS. 3 and 4A–C. In general, the list is generated by aggregating the client demand feedback data, and optionally, applying server-side considerations such as whether a piece of content was recently broadcasted and various business considerations, such as contractual agreements with a broadcast service provider. Further details concerning how the broadcast schedule queue is generated are described below.

In one embodiment, the broadcast operations center then selects pieces of content to broadcast based on the client demand feedback data. In one embodiment, the pieces of content that are to be broadcast are determined based on rating information provided by the client systems. As a result, only the most appropriate pieces of content for the customer base (i.e., users of the client systems) are broadcasted by the broadcast operations center. For instance, in one embodiment, only the pieces of content having the highest aggregated ratings are broadcast, while those pieces of content having the lowest ratings are not broadcast. In one embodiment, the broadcast schedule is also determined in response to be ranking. For instance, in one embodiment, the highest ranked data files are broadcast before lower ranked data files. In another embodiment, the highest ranked pieces of content are broadcast at a time assumed most appropriate to send highly ranked content. For instance, assume an example where Thursday evenings during primetime is the most important time for a broadcaster to have the highest ratings for broadcast. In this example, a broadcast operations center in accordance with teachings of the present invention would broadcast a data file corresponding to the highest-ranking piece of content on Thursday evening during primetime. It is appreciated, of course, that this example was given for explanation purposes only and that a broadcast operations center may determine a broadcast schedule in other ways in response to demand feedback data received from the client systems.

In one embodiment, the data files to broadcast and/or the broadcast schedule are determined dynamically by the broadcast operations center in response to the client demand feedback data received from the client systems in accordance with teachings of the present invention. Therefore, in one embodiment, broadcast schedules can change over time depending on which pieces of content are available from the broadcast operations center and which content or data files are accessed and/or classified by the clients.

Once the pieces of content to be broadcast and the broadcast schedule are determined by the broadcast server, broadcast server 103 then broadcasts the content broadcast schedule to the clients in a block 320. The clients then receive the content broadcast schedule in a block 322. In other embodiments, there is no broadcasting of the content schedule, as indicated by the dashed outlines of blocks 320 and 322.

The next operation to be performed is to deliver content with the highest level of client demand (generally) to the clients. This is indicated by blocks 326 and 328 in FIG. 3, and is indicated by an encircled "4" in FIGS. 3 and 4A–4C. In one embodiment, opportunistic scheduling is used, wherein the next "most valuable" piece of content is broadcast on a continual basis. In another embodiment, batches of content are periodically broadcast. The broadcasting of one or more data files corresponding to exemplary pieces of content A, B, and C are shown in FIGS. 4A–4C, wherein the content is collectively identified by a set of content data files 135. Further details of each of these content-broadcasting embodiments are discussed below.

For embodiments in which content broadcast schedules have been previously sent, data files corresponding to each piece of content in the schedule are broadcast from the broadcast operations center at the scheduled time. In one embodiment, the clients wake-up at the pre-specified time indicated in the data file broadcast schedule to receive the data file(s) for a piece of content from the broadcast server. In other embodiments, content is broadcast on a "near real-time" basis, wherein prior schedule information has not been broadcast for that content. For the purposes of this invention, "near real-time" means the content is sent shortly after it has been identified as the most-desired content (e.g., 1 hour or less). In these instances, broadcasting a schedule for such content is optional.

After broadcasting a piece of content, attribute values corresponding to that content are recalculated to re-rank the pieces of content in the ordered list used for the broadcast schedule queue. In general, this will return the piece of content to the bottom of the list, as provided by a block 228, since the demand for that piece of contents by the client systems should be effectively filled by its preceding broadcast. As described below, the client demand feedback data for that piece of content is "reset," such that only new (i.e., subsequently received) client demand feedback data concerning that piece of content is considered when the ordered list is recalculated Upon receiving the broadcasted content, in one embodiment the client selectively stores data files according to the content rating table stored on the client system as those data files are broadcast, as provided by a block 330. There are various mechanisms that may be used to determine when a particular piece of content is captured and cached (i.e., stored) on a given client system, and when other broadcasted content is ignored. In one embodiment, client demand feedback information, such as content rating and/or ranking data that is stored on the client system, is used to determine when a data file corresponding to a particular piece of content is to be captured and cached. The available storage space on a client system may also be considered. For example, if a client system has a content rating table indicating that a particular movie has a maximum rating, the data file corresponding to the movie will generally be captured and cached when that data file is broadcast.

In some instances, the determination on whether to capture and cache a new piece of content will depend on how the user rated content that is presently stored on the client system. For example, if a client system is substantially full (i.e., it cannot store an entire data files or files corresponding to a new piece of content) and all of the pieces of content stored on the client system that has yet to be watched has a higher rating than the piece of content that is next to be broadcast, that content will be ignored. Examples of content that are cached and ignored are depicted in FIGS. 4A–C, wherein clients systems 105$x$ selectively cache content A and B, while ignoring content C, client systems 107$x$ selectively cache content A, while ignoring content B and C, and client system 109$x$ selectively cache content C, while ignoring content A and B.

In cases where a particular piece of content on a given client system has been accessed, in one embodiment it will generally be presumed that the user no longer demands to access that piece of content as much as he or she previously did when the rating for that piece of client was originally generated. For purposes of this disclosure, a user access may include a user interacting with, viewing, watching, listening to, reading, consuming, etc., a data file. For instance, one example of a user accessing a data file may be the user watching a particular movie or listening to a particular song provided by one of the stored data files in client. Accordingly, when a user accesses a piece of content for viewing, the meta-data table and the content rating table entries corresponding to that piece of content are updated by the client system in a block 332.

Figure 5:
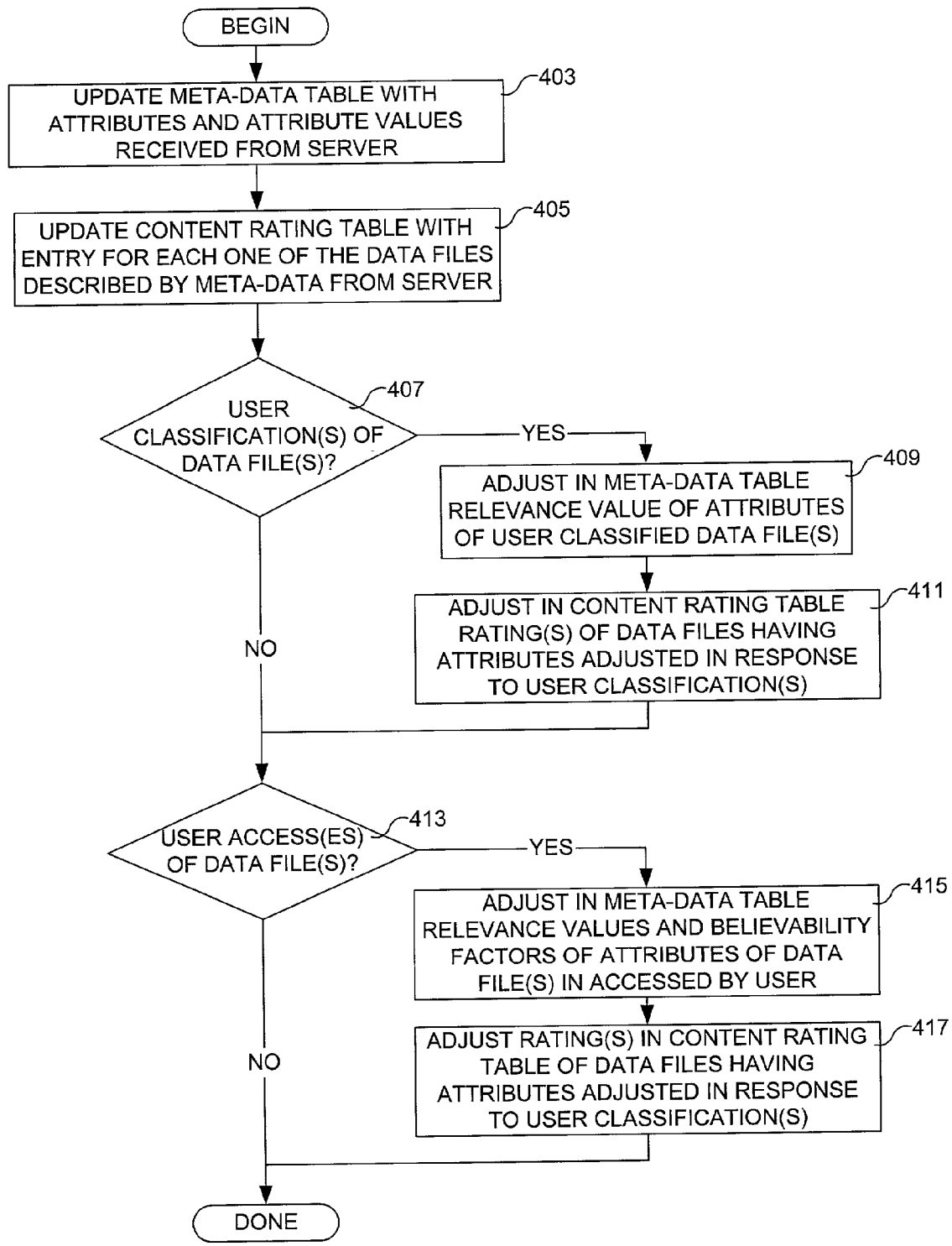
FIG. 5 is a flow diagram illustrating one embodiment of the flow of events in a client system when processing meta-data broadcast from a server to maintain a meta-data table and content rating table.

FIG. 5 is a more detailed flow diagram illustrating one embodiment of the flow of events in a client when processing meta-data 127 and updating and maintaining a meta-data table and a content rating table in accordance with the teachings of the present invention. In particular, the process begins in a block 403 in which a meta-data table is updated with attributes and attribute values included in the meta-data broadcasted from the server. In a block 405 the content rating table is then updated with an entry for each one of the data files described by the meta-data.

In one embodiment, it is assumed that a meta-data table, a content rating table and a plurality of data files already exist in the client system. In one embodiment, the meta-data table, content rating table and plurality of data files may be stored and maintained in the client system in memory 305, storage 311 or by accessing a local network or the like with machine 301, as illustrated in the embodiment shown in FIG. 2.

An exemplary set of meta-data 501 corresponding to four pieces of content is depicted in FIG. 6. For explanation purposes, it is assumed that the data files corresponding to the four pieces of content are audio/video files such as movies or TV programming. As mentioned above, the data files that are broadcast may comprise other types of files such as audio, graphics, text, multi-media or the like.

In the illustrated embodiment, meta-data 501 indicates that four movies, or more specifically, four data files corresponding to the four movies, are considered for broadcast by the broadcast operations center. These movies include "Action Dude," "The Funny Show," "Blast 'Em" and "Hardy Har Har." In general, the meta-data will include attributes and attribute values that "describe" each piece of content the meta-data corresponds to. In one embodiment, the meta-data is delivered in a tabular format, wherein the attributes correspond to columns in the format, and the attribute values comprise the row data for the meta-data. For example, meta-data 501 includes three attribute columns, labeled "Name", "Actor" and "Genre." It is appreciated that other embodiment of the present invention may include different attributes as well as different attributes values. For instance, a non-exhaustive list of other attributes that may be used to describe movies may include "Director," "Additional Actors", "Year," "Effects," "Ending," etc. In one embodiment, for example, 40–50 different attributes are provided to describe movies in accordance with the teachings of the present invention.

In the exemplary set of meta-data 501, "Action Dude" is an "action" movie featuring actor "Joe Smith." "The Funny Show" is "comedy" movie featuring actress "Jane Doe." In addition, "Blast 'Em" is an "action" movie featuring actress "Jane Doe," and "Hardy Har Har" is a "comedy" movie featuring actor "Joe Smith."

To help illustrate the meta-data table aspect of the present invention, FIG. 7 is an example of one embodiment of meta-data table 601, which is updated and maintained locally by each client 105, 107 and 109. In the illustrated embodiment, meta-data table 601 in FIG. 6 has been populated with the data included in meta-data 501, which was broadcasted earlier from server 103. In one embodiment, meta-data table 601 includes a list of attributes, attribute values and corresponding relevance values and believability factors. In particular, meta-data table 601 includes attribute values "Joe Smith," "Jane Doe," "action," and "comedy." At this time, the relevance values and believability factors for attribute values "Joe Smith," "Jane Doe," "action," and "comedy" are all zero. As will be shown, in one embodiment, the relevance values and believability factors of the present invention will be updated and maintained as the user interacts with the client system.

In one embodiment, the relevance values in meta-data table 601 are indicators as to how relevant the associated attribute and attribute values are for predicting a particular user's behavior. For instance, the relevance value indicates how likely it is for the user to watch a particular movie because of this particular attribute value. In one embodiment, relevance values in meta-data table 601 are within a range of values such as, for example, from –10 to 10. As will be discussed, the relevance value may be increased if, for example, the user watches a particular movie or at least expresses an interest in a particular movie having that particular attribute value. Conversely, the relevance value may be decreased if the user, for example, does not watch a particular movie or if the user explicitly indicates that he or she does not want to watch a particular movie having that particular attribute value.

In one embodiment, the believability factors in meta-data table 601 are weighting factors to be applied to specific attribute and attribute value pairs when rating or predicting whether a user will actually access a particular piece of content having that particular attribute value. In one embodiment, believability factors in meta-data table 601 are within a range of values, such as from –10 to 10. In one embodiment, the believability factors may be increased when an attribute value accurately predicts a piece of content in which the user is interested. Conversely, the believability factors may be decreased when a user is interested in the piece of content, even though the particular attribute value indicates otherwise.

In one embodiment, meta-data table 601 entries are constructed from the aggregation of all meta-data 501 associated with potential content or data files to be broadcast from server 103. In one embodiment, entries in meta-data table 601 are updated based on explicit user requests. In addition, updates to meta-data table 601 may also be implicitly based on whether a user accesses specific data files having particular attribute values, independent of whether the user explicitly classifies a particular movie.

To help illustrate the content rating table aspect of the present invention, FIG. 8 illustrates an example of one embodiment of a content rating table 701, which in one embodiment is updated and maintained locally by each client 105x, 107x and 109x. In the illustrated embodiment, content rating table 701 includes a list of the data files described in meta-data 501 as well as any additional data files that are currently stored or cached locally on the client system.

In one embodiment, data files corresponding to previously-cached pieces of content may be stored locally by the client in memory 305, storage 311 or in a locally accessible network by machine 301 of FIG. 2. For purposes of this disclosure, data files being stored locally by the client may also be interpreted to include a data file stored "locally" by the client in a known network storage configuration, separate from the server. For purposes of this disclosure, the data file being stored or cached locally by the client is to be interpreted as the data file being stored for later access, retrieval or consumption. In one embodiment, the local cache of the present invention is considered to be a first level cache. Thus, the local cache the present invention is sized accordingly to increase the possibility of a single hit.

Referring back to the continuing example of data files representing audio/video files, a movie is stored locally by the client. After a user watches the movie, the storage space occupied by the movie is generally considered to be available for storage of another piece of content to be broadcast sometime later. Thus, it is appreciated that the local cache of the client system is modeled as a single use system, e.g., fire and forget, in accordance with teachings of the present invention. In one embodiment, it is assumed that when a user accesses a data file, it is not likely that the user will want to access that same data file again. If a user has not watched a particular piece of conent, the storage space occupied by that piece of conent is generally considered not to be available for storage of another piece of content. However, if there is no additional storage space available and a higher rated piece of conent is to be broadcast, the lower rated unwatched piece of content may be replaced by the higher rated piece of content in accordance with the teachings of the present invention. For example, in one embodiment the user of a client system may select a switch that enables stored data files to automatically be replaced by one or more data files corresponding to higher rated pieces of content when those data files are broadcast. Conversely, the user may desire to manually manage which data files are stored on his or her client system.

Referring back to the embodiment of content rating table 701 shown FIG. 8, each movie also has an associated "RATING" value, a "RATING TYPE" indicator, an "IN CACHE" indicator and a "NEXT TREATMENT" indicator. In one embodiment, the rating values indicate a level of desirability to receive an associated piece of content. The rating value in one embodiment may either be explicitly input by a user or implicitly generated by the client system by processing meta-data associated with that particular data file. In one embodiment, a relatively high rating value predicts that the particular data file may be of interest to the user. Conversely, a relatively low rating value predicts that the particular data file is unlikely to be of interest to the user.

In one embodiment, the "RATING TYPE" indicator indicates whether the rating value of this particular piece of content was a result of explicit input from the user or if the rating value was implicitly generated by the client system. Thus, in one embodiment, the "RATING TYPE" indicator of content rating table 701 may be "EXPLICIT," "IMPLICIT" or "N/A" if the data file or movie has not yet been rated. In one embodiment, if a data file has been explicitly classified by a user, the rating values of attribute values of the data file are no longer updated implicitly by the client system. However, if a data file has not yet been classified or has only been implicitly rated by the client system, the rating of the attribute values of the data file may be further updated or adjusted by the client system.

In one embodiment, the "IN CACHE" indicator indicates whether that particular data file is currently stored or cached locally by the client. In the embodiment illustrated in FIG. 8, the movies "Action Dude," "The Funny Show" and "Blast 'Em" already exist in the local storage of the client system. Conversely, the movie "Hardy Har Har" has not been stored in the local storage of the client system.

In one embodiment, the "NEXT TREATMENT" indicator is used to track future actions to be taken for the particular data file. For example, if a movie has already been watched by the user, the next treatment indicator would indicate "REPLACE" to indicate that the storage space occupied by that particular movie is available for storage of another movie. In one embodiment, if the movie has not yet been watched by the user, the next treatment indicator would indicate "KEEP." In one embodiment, if the movie has not been stored locally by the client and if the rating value predicts that this particular movie may be of interest to the user, the next treatment indicator would indicate "CAPTURE." In one of embodiment, if the movie has not yet been broadcast by the server and the rating predicts that this movie is unlikely to be of interest to the user, the next treatment indicator would indicate "IGNORE."

As discussed above, users may provide explicit inputs that are used to determine what content should be cached, and what content should be ignored; these inputs are termed "classifications." In one embodiment, as illustrated in FIG. 9, a user can explicitly "classify" selected pieces of content to indicate whether the user would like that a piece of content cached or not cached by entering or selecting "RECEIVE" or "REFUSE", respectively. In the example illustrated in FIG. 9, the user has indicated that he or she would like to cache the movie "Action Dude" by classifying that movie with a "RECEIVE" classification, while the user has expressed that he or she does not have any interest in the movie "The Funny Show" by classifying that movie with a "REFUSE" classification. In this example, the user has not provided any information or classification regarding any of the remaining movies.

Returning to the flowchart of FIG. 5, if the user has classified any of the data files, the answer to a decision block 407 is YES, and the relevance values of the particular attributes of the classified pieces of content are updated in meta-data table 601 in a block 409. In a block 411, the ratings of data files having attribute values with relevance values that were adjusted in response to the user classification(s) are also adjusted. If the user has not classified any data files, blocks 409 and 411 are skipped.

To illustrate an example of when a user classifies data files, FIG. 10 shows meta-data table 601 after it has been updated or adjusted in response to a user classification. As discussed above, the user indicated he or she was interested in the movie "Action Dude." As described by meta-data 501, "Action Dude" features actor "Joe Smith" and is an "action" movie. Thus, referring to a meta-data table 601A in FIG. 10, the relevance values for attribute values "Joe Smith" and "action" are adjusted to reflect that the user explicitly expressed an interest in "Action Dude." In one embodiment, the relevance values are increased to reflect that the user was interested. As will be discussed, in one embodiment, the believability factors associated with each attribute value are not updated until there is a user access of the data file corresponding to the piece of content having that particular attribute value.

Continuing with the example of FIG. 9, the user indicated that he or she was not interested in the movie "The Funny Show." Meta-data 501 shows that "The Funny Show" features actress "Jane Doe" and is a "comedy" movie. Thus, referring back to meta-data table 601A, the relevance values for attribute values "Jane Doe" and "comedy" are adjusted to reflect that the user explicitly expressed that he or she was not interested in "The Funny Show." In one embodiment, the relevance values are decremented to reflect that the user was not interested.

Continuing with the example of FIG. 9, the user did not provide any information regarding the movies "Blast 'Em" and "Hardy Har Har." Accordingly, the relevance values of the attribute values associated with "Blast 'Em" and "Hardy Har Har" are not updated in meta-data table 601A.

As will be discussed, in one embodiment, updates to the ratings in content rating table 701, as described in block 411, are related to the relevance values and believability factors of the attribute values listed in meta-data table 601. A detailed description of the processing that occurs in block 411 is substantially the same as the processing that occurs in a block 417 below.

Referring back to FIG. 5, if the user accesses any of the data files, e.g. the user watches a movie, as determined in a decision block 413, the relevance values and the believability factors of the particular attributes of the user accessed data files are updated in meta-data table 601 in a block 415. The logic then flows to a block 417, in which the ratings of data files having attribute values with relevance values that were adjusted in response to the user access(es) are also adjusted. If the user has not accessed any data files, blocks 415 and 417 are skipped.

To illustrate an example of a user accessing data files, assume that the user watches the movie "Action Dude." Meta-data 501 shows that "Action Dude" features actor "Joe Smith" and is an "action" movie. In one embodiment, each time a user accesses or interacts with particular data file, the believability factor of the attribute values of that film are adjusted or updated. In one embodiment, for attribute values having relevance values greater than zero, the believability factor for that attribute value is increased, since that attribute value accurately served as a predictor for a data file that the user would access. In one embodiment, for attribute values having relevance values less than zero, the believability factor for that attribute value is decreased, since that attribute value did not accurately serve as a predictor for a data file that the user would access. Therefore, FIG. 11 shows a meta-data table 601B in which the "BELIEVABILITY" column has been updated or adjusted in response to the user access of "Action Dude." In this example, the believability factors of "Joe Smith" and "action" are increased since the relevance values for these attribute values were greater than zero.

In one embodiment, the relevance values associated with implicitly rated pieces of content are also increased in meta-data table 601B in response to a user access. However, in the example of meta-data table 601B shown in FIG. 11, "Action Dude" was explicitly classified by the user. In one embodiment, the relevance values are not updated in meta-data table 601 in response to a user access of data files explicitly classified by the user.

FIG. 12 shows a content rating table 701A corresponding to content rating table 701 after it has been updated in a block 417 in response to the user access of "Action Dude." As discussed above, content rating table 701 is also updated in block 411 in accordance with the teachings of the present invention. As shown in content rating table 701A, "Action Dude" has a rating value of 1. The rating type of "Action Dude" is "EXPLICIT" because the user explicitly classified "Action Dude," as described above in connection with FIG. 9. The "IN CACHE" indicator indicates that "Action Dude" is presently stored locally by the client system. The "NEXT TREATMENT" indicator indicates "REPLACE" because the user has already watched "Action Dude."

In one embodiment, the rating values in content rating table 701 are determined as follows. Meta-data 501 shows that "Action Dude" has the attribute values "Joe Smith" and "action." Meta-data table 601B shows that "Joe Smith" has a relevance value of 1 and a believability factor of 1. Meta-data table 601B also shows that "action" has a relevance value of 1 and a believability factor of 1. In one embodiment, the rating value of a particular data file is determined considering the all of the relevance values combined with their respective believability factors for all the attribute values of the data file. For instance, in one embodiment, the rating value for a data file is equal to the average of all of products of each relevance value and corresponding believability factor for the attribute values of the data file.

To illustrate, referring to "Action Dude" in content rating table 701A, the product of the relevance value and believability factor of "Joe Smith" is 1*1, which equals 1. The product of the relevance value and believability factor of "action" is 1*1, which equals 1. The average of the products, 1 and 1, is 1. Therefore, the rating of "Action Dude" in content rating table 701A is 1.

Similarly, with regard to "Blast 'Em" in content rating table 701, "Blast 'Em" has the attribute values "Jane Doe" and "action." The relevance value and believability factors for "Jane Doe" in meta-data table 601B are −1 and 0, respectively. Thus, the rating of "Blast 'Em" in content rating table 701A is the average of 1*0 and 1*1, which equals 0.5. The ratings for "The Funny Show" and "Hardy Har Har" in content rating table 701A in the example shown in FIG. 12 are determined in a similar fashion in one embodiment of the present invention.

It is noted that since the user classified the movies "Action Dude" and "The Funny Show" above in FIG. 9, these movies have an "EXPLICIT" rating type as shown in content rating table 701A. Since the user did not classify the movies "Blast 'Em" and "Hardy Har Har," these movies have an "IMPLICIT" rating type in content rating table 701A.

It is appreciated that the discussion above provides one example of how the rating values in content rating table 701 are determined in accordance with the teachings of the present invention. It is noted that ratings values may be determined in other ways in accordance with the teachings of the invention, which consider the relevance values and believability factors for each of the attribute values of a piece of content.

In one embodiment, the entries for the "NEXT TREATMENT" column in content rating table 701A is determined, in part, by the rating and in cache values for the particular piece of content. For example, assume in one embodiment that a rating of greater than zero indicates that the user is predicted to have at least some interest in that particular movie. Therefore, the movies "Blast 'Em" and "Hardy Har Har" may be of some interest to the user. Thus, the next treatment indicates that the movie "Blast 'Em" will be kept in storage and the movie "Hardy Har Har" will be captured when it is later broadcast by the server. As mentioned above, the movie "Action Dude" is marked for replacement in the next treatment field because it has already been watched by the user.

In one embodiment, future interactions by a user with the client system result in similar processing as described above. For instance, assume that the user now watches the movie "Blast 'Em." In this particular example, the user did not classify the movie "Blast 'Em" before watching the movie. In one embodiment, both of the relevance values and believability factors are updated for the attribute values of unclassified data files that are accessed, as shown in meta-data table 601C of FIG. 13. Recall from meta-data 501 that the movie "Blast 'Em" features "Jane Doe" and is an "action" movie. As shown in FIG. 11, the relevance value of "Jane Doe" was less than zero, or −1, prior to the user watching "Blast 'Em." Nevertheless, in this example, the user watched "Blast 'Em," despite the fact that it featured actress "Jane Doe." Accordingly, the believability factor of the "Jane Doe" attribute the value is adjusted downward since this particular attribute value now appears less likely or relevant when predicting a user's viewing habits. In one embodiment, since the relevance value is already less than zero, the believability factor is not adjusted further downward. However, the relevance value and believability factor for the attribute value "action" are adjusted upwards since "action" had a relevance value of greater than zero prior to the user watching "Blast 'Em." Thus, in this example, the relevance value is adjusted upwards from 1 to 2 and the believability factor is also adjusted upwards from 1 to 2. Therefore, the content rating table 601C now predicts that "action" movies are movies that the user is more likely to watch.

In one embodiment, each time the user interacts with the client system, meta-data table 601 and content rating table 701 are updated. Updates to meta-data table 601 and content rating table 701 are performed when the user accesses data files corresponding to each piece of content as well as when the user explicitly classifies the pieces of content. It is appreciated that the user is not required to classify pieces of content explicitly in order for meta-data table 601 and content rating table 701 to be updated. As a result, the content rating table, over time, will more accurately predict pieces of content in which the user is interested.

In one embodiment, the pieces of content in which the user is predicted implicitly to be most interested as well as the pieces of content in which the user explicitly classified an interest in will be the pieces of content that are cached locally on the client system. In effect, the pieces of content that the user is most likely to want to watch are automatically stored locally, and therefore available "on demand," in accordance with teachings of the present invention without the user having to explicitly request these movies in advance or explicitly specify criteria used to identify the movies.

As can be appreciated, by storing the data files corresponding to the pieces of content locally on each client, broadcast bandwidth is utilized more efficiently in accordance with teachings of the present invention. Indeed, when a user watches a movie from the local storage of the client, no additional broadcast bandwidth is utilized. In addition, it is also appreciated that a substantial amount of the processing performed in a system according to the teachings of the present invention is performed on each of the client systems when updating their respective meta-data tables and content rating tables. This distributed processing of the present invention enables the presently disclosed broadcast system to scale across a very large number of users since the incremental cost to the server for each additional client is minimal.

As discussed above, the client systems may send feedback information that is automatically generated based on past viewing habits, content ratings and classifications, manually generated by the user(s) of the client systems, or a combination of automatic and manual generation. For example, as discussed above with reference to FIG. 11, the rating values for each piece of content were automatically generated.

Figure 14:
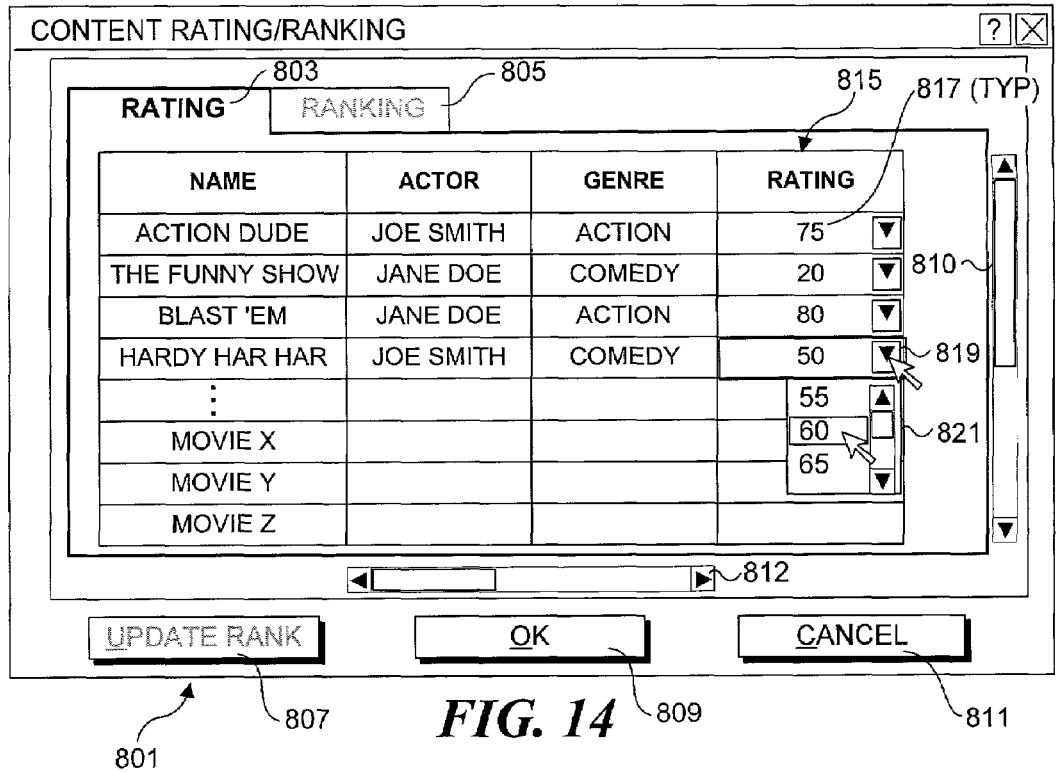
FIG. 14 in a representation of a user interface that enables users of client systems to enter ratings and ranking data, wherein user-interactions with a ratings tab are illustrated.

An exemplary user-interface 801 that enables users to rate and/or provide relative rankings for pieces of content that are considered for an upcoming broadcast is depicted in FIG. 14. User-interface 801 includes a rating tab 803 and a ranking tab 805, an "UPDATE RANK" button 807, and "OK" button 809 and a "CANCEL" button 811. The user interface may also include a vertical scroll bar 810 and a horizontal scroll bar 812. Rating tab 803 includes a using rating table 813 that will typically include a set of columns pertaining to a current set of meta-data that was most-recently sent, along with a rating column 815 in which the user may enter a rating value 817 for each piece of content. In the illustrated embodiment, rating table 813 includes the entirety of meta-data 501. The rating table may include additional columns (not shown) corresponding to other meta-data attributes, such as director, additional actors, a plot narrative, etc. These additional columns may be accessed by activating horizontal scroll bar 812, wherein the user interface is designed in one embodiment such that the rating column 815 is always visible to the user, regardless of which attribute columns are currently displayed.

In one embodiment, a user may enter a rating value 817 from 0–100 for selected pieces of content, wherein a low rating value indicates the user is not interested in receiving data files corresponding to a piece of content and a high rating value indicates the user is interested in the piece of content. In one embodiment, the user may enter rating values 817 by using a keyboard, keypad, or the like. For example, as discussed above, the client systems may comprise set-top boxes, which are generally accessed through use of a remote control or a remote keyboard, such as depicted by a remote keyboard 137 in FIGS. 4A and 4B. When a client system comprises a desktop computer, the computer's keyboard may be used to enter the data, as depicted by a keyboard 139 in FIG. 4C. Optionally, a dropdown control 819 may be provided for each row, wherein the user can select a rating value from a dropdown list 821 through use of an input device such as a set-top box curser device (not shown) for set-top box client systems, or a mouse or similar input device for computer client systems, such as depicted by a mouse 141 in FIG. 4C.

Figure 15A:
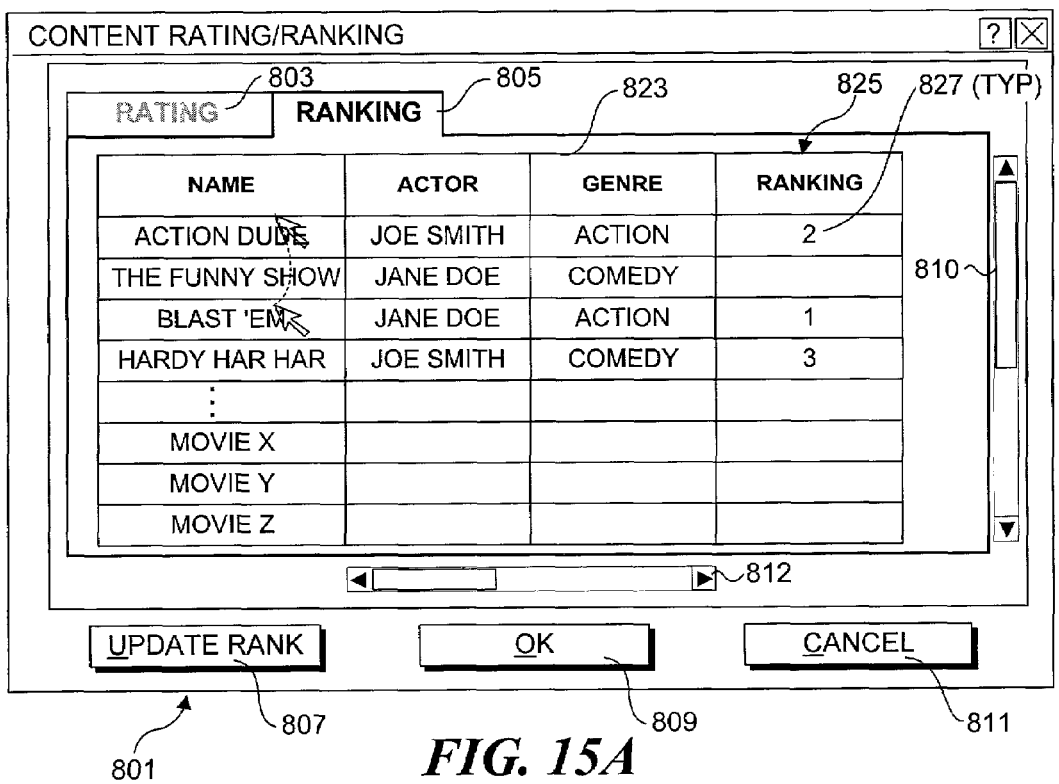
FIG. 15A is a representation of the user-interface of FIG. 14, wherein users are enabled to enter relative ranking information via a ranking tab that supports numerical entry of ranking data and dragging and dropping content identifiers to reorder the relative rankings.
Figure 15B:
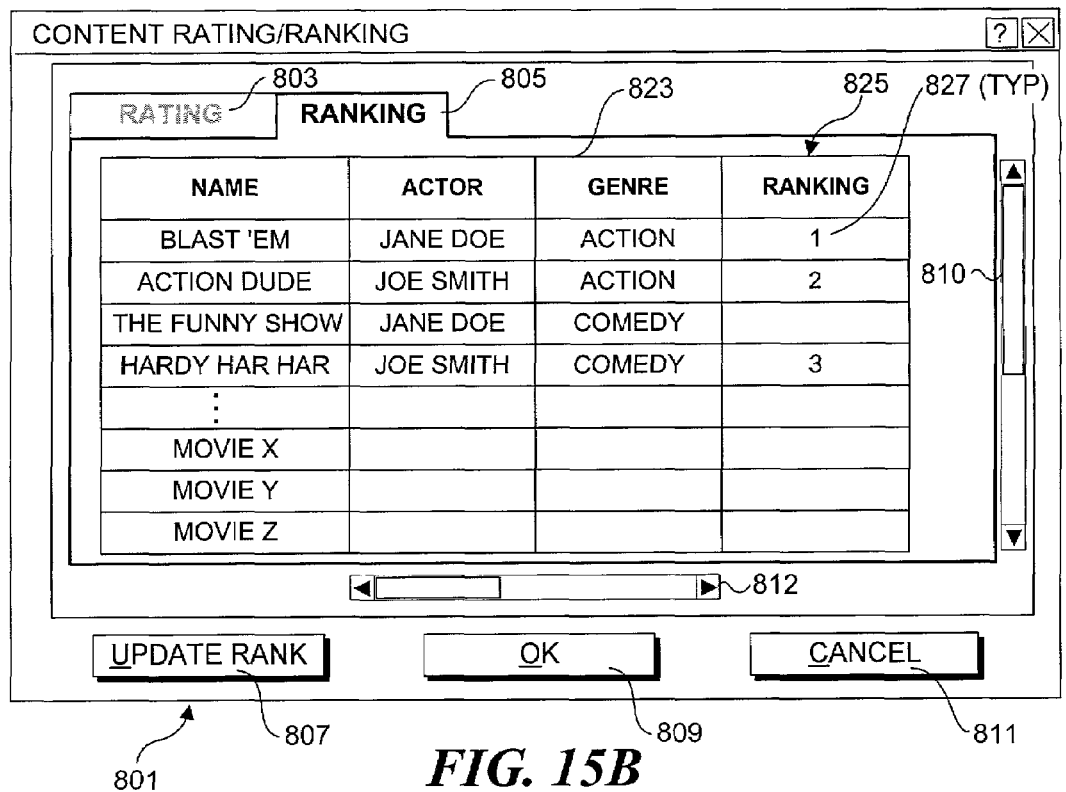
FIG. 15B is a representation of the user-interface of FIG. 14 in illustrating the effect of dragging and dropping a content identifier corresponding to an a piece of content in FIG. 15A.
Figure 15C:
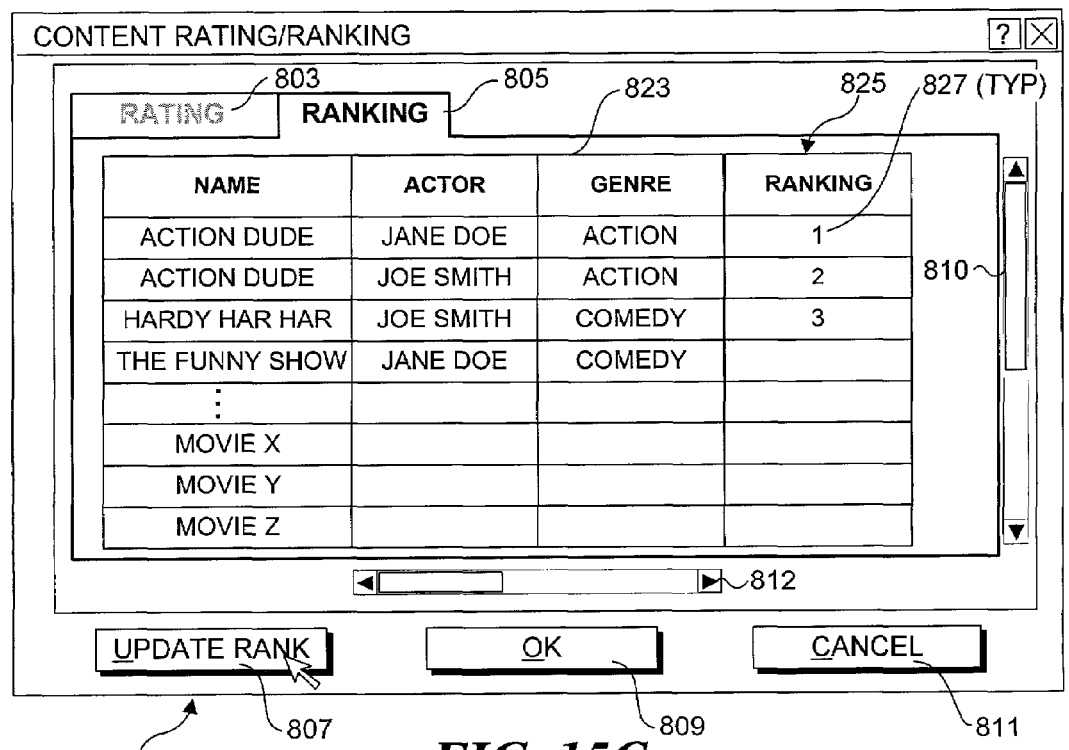
FIG. 15C is a representation of the user-interface of FIG. 14 that illustrates how the relative rankings may be updated by activating an update rank button.

Various user-interface views of ranking tab 805 are shown in FIGS. 15A–15C. Ranking tab 805 includes a ranking table 823 that includes columns that are similar to the columns in ratings table 813, except rating column 815 is replaced with a ranking column 825. Users may enter relative ranking values 827 in ranking column 825 to reflect the user's relative ranking of all or a portion of the pieces of content corresponding to a current set of meta-data received by a client system. For instance, a user may enter ranking values of 1, 2, 3, etc., as depicted in FIG. 15A. Optionally, a user may drag and drop selected pieces of content to new positions in ranking table 823, as depicted by a cursor drag and drop movement 829 in FIG. 15A, wherein the results of this action are reflected in FIG. 15B. As illustrated in FIG. 15C, in one embodiment, a user can activate update rank button 807 to cause the pieces of content in ranking table 805 to be re-ordered in view of their rankings, wherein the highest-ranked pieces of content appear at the top of the table.

After the content ratings and/or relative rankings have been manually entered and/or automatically generated, a set of client demand feedback corresponding to the current set of meta-data is sent back to the broadcast operations center. In generally, the client demand feedback data can be sent back on a periodic basis or asynchronously. For example, in embodiments in which the metadata is broadcast via a schedule, a similar schedule that is offset from the metadata broadcast schedule may be used to cause the client demand feedback data to be sent back to the broadcast operations center in a substantially "batch" mode. Alternatively, upon expiration of a predetermined time period or upon a detection that a user has rated or ranked pieces of content corresponding to the current set of meta-data, the client demand feedback data may be sent back to the broadcast operations center. This is termed "asynchronous" because the client demand feedback data is sent in a manner that does not adhere to a schedule, and is substantially random. In another embodiment, ratings data for an individual piece of content are sent to the broadcast operations center as a client system processes the content descriptor for that piece of content.

In general, the client demand feedback data reflects a level of desirability for users of a given client system to receive pieces of content corresponding to the current set of meta-data. This feedback demand data may comprises manual ratings, manual rankings, automatically generated ratings, or a combination of these feedback demand attribute values. For example, in one embodiment the client demand feedback data only includes user-generated ratings and/or rankings, wherein there is no feedback data for pieces of content that have not been rated and/or ranked by a user of a client system. In one embodiment, ratings for any pieces of content that are not user-generated are automatically generated using the process described above with reference to the flowchart of FIG. 5. In yet another embodiment, a combination of automatically and manually generated feedback is used, but only the feedback data corresponds to only a portion of the pieces of content in the current set of meta-data.

In instances in which a combination of manually and automatically-generated demand feedback data is used, a scaling/offset algorithm may be applied to provide a commonly-weighted set of demand feedback data that more accurately reflects desirability levels indicating the pieces of content a user desires to receive. For example, in the foregoing examples the automatically-generated ratings have a scale from −10 to 10, while the user-generated ratings have a scale from 0–100. Either of the two scales could be adjusted so as to produce a set of ratings values using a common scale. For example, each value in the −10 to 10 scale could be multiplied by 5 and then have 50 added to it to produce an equivalent value that fits the 0–100 scale. In other instances, it may be desired to weight a user's explicit ratings higher than the automatically-generated ratings. Thus, in the foregoing example, a −10 to 10 automatic scale value could be scaled by a scale factor and offset that would result in a rating value of less than 100 for a maximal automatically-generated value of 10.

In addition to manually ranking pieces of content, other pieces of content may be automatically ranked by first automatically generating a rating value for those pieces of content, and then producing a relative ranking based on these rating values. In one embodiment, when the manually and automatically-ranked values are combined, the highest ranked automatically-ranked piece of content is ranked below the lowest ranked manually-ranked piece of content. In one embodiment, automatically-ranked pieces of content may occupy any position in the combine set of relative rankings included in the client demand feedback data. In yet another embodiment, there is a gap between the lowest-ranked manually ranked piece of content and the highest ranked automatically-ranked piece of content. For example, suppose that a particular set of meta-data corresponds to 40 pieces of content that are considered for broadcast by the broadcast operations center, and a user ranks selected pieces of content from 1–9. The remaining 31 pieces of content could then be ranked for 10–40, or 15–45, 20–50, etc. This would provide a weighting factor that favors user rankings more so than automatically-generated rankings.

Another consideration that may be used in weighting the client demand feedback data is the revenue potential that may be generated by having the client system cache a particular piece of content. For example, pay-per-view content may have a weighting factor that increase the demand "value" for such content in the client demand feedback data. In one embodiment, the revenue potential may be used in a tie-breaker when rankings are used. In other embodiments, the revenue potential may raise a rating value or relative ranking value.

Figure 16:
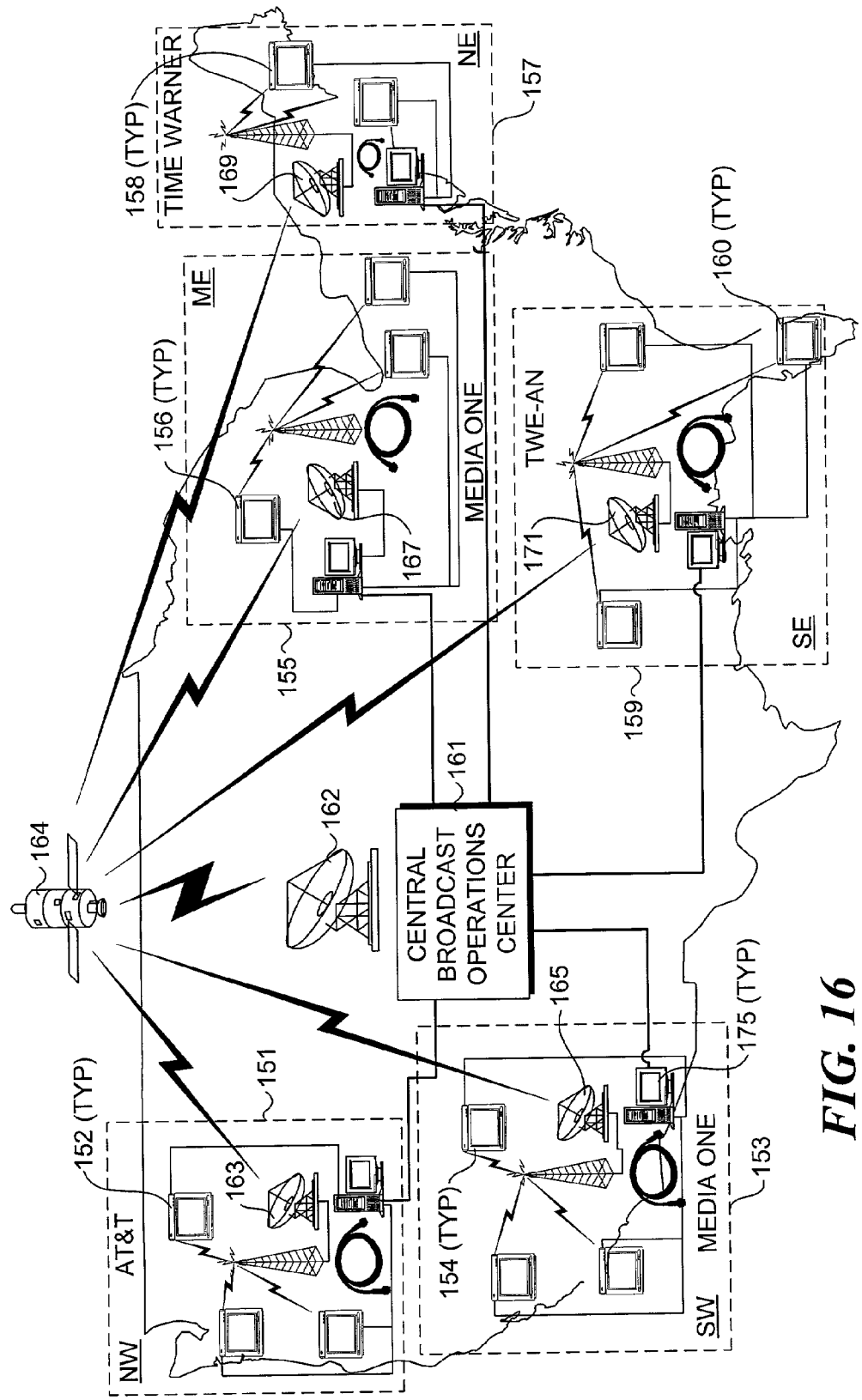
FIG. 16 is a schematic diagram illustrating how various client systems may be segmented based on geography and broadcast network.

Another aspect of the invention concerns the segmentation of client systems, wherein different (or the same) sets of meta-data and corresponding client demand feedback data may be broadcast to and received from different sets of segmented client. For example, sets of client systems may be segmented based on geographical regions, such as depicted in FIG. 16, which includes five sets of client systems 151, 153, 155, 157, and 159, which are segmented among five regions, including a Northwest region NW, a Southwest region SW, a Mideast region ME, a Northeast region NE, and a Southeast region SE. In one embodiment, various sets of clients are segmented in correspondence with a network they use to receive broadcasts, such as a cable system provided by a local cable provider, as depicted in FIG. 16 by AT&T broadband subscribers 152, Southern California Media One subscribers 154, Chicago area Media One subscribers 156, New York area Time Warner Cable subscribers 158, and southeast TWE-AN subscribers 160. In another embodiment, the sets of clients are segmented based on the MSO (multiple system operator) who operates their broadcast network. For instance, the top seven cable MSO's include AT&T broadband, Time Warner Cable, Comcast Cable Communications, Charter Communications, Cox Communications, Adelphia Communications, and Cablevision Systems, wherein each MSO operates multiple local cable systems that may be dispersed across a wide geographical region.

As depicted in FIG. 16, in one embodiment, the same or different sets of meta-data and/or subsequent broadcasts of content may be broadcast from a central broadcast operations center 161, which sends data from a transmitting antenna 162 via an uplink to one or more satellites 164, which then broadcasts the data to receiving antennas 163, 165, 167, 169, and 171, which are operated by respective local cable system operators. The local cable system operator then transmits the meta-data and/or broadcast content to its subscriber clients. In some instances, the cable system operator will "store" the broadcast data it receives and "forward" the data to its subscriber clients at a subsequent point in time. This type of broadcasting scheme is known as a multistage "store and forward" broadcast, wherein the data is broadcast between different "stages," stored by that stage, and forwarded to the next stage to meet broadcast schedule preferences of the current stage. In the embodiment illustrated in FIG. 16, the three stages are the central broadcast operations center, local cable system operators, and client systems corresponding to subscriber clients of the local cable systems. In this instance, the cable system operators represents an intermediate stage. There may also be additional intermediate stages, such as an MSO receiving and storing broadcast data at a central location and then forwarding it to one or more local cable system operators operating under the MSO, whereupon the local cable system operators can independently store and forward the broadcast data to its subscribers. In one embodiment, the MSO forwards the broadcast data to the local cable system operators at different points in time.

It is noted that the client systems may directly receive data from central broadcast operations center 161 if they are configured to receive communications from a satellite broadcast system or other type of broadcast link that couples the client system to the broadcast operations center. In one embodiment, as depicted in FIG. 16, each segmented set of clients provides client feedback data to a local server 175, which then forwards the client demand feedback data to central broadcast operations center 151. Optionally, each segmented set of clients may receive broadcasts and send client demand feedback data back to a local broadcast operations center.

As discussed above, as individual sets of client demand feedback data are generated by various client systems, they are sent back via a "back channel" communications link to the broadcast operations center, where they are aggregated to build the ordered used for broadcast schedule queue 133. The particular "back-channel" communications link that is used will depend on the broadcast and feedback system infrastructure. Once the client demand feedback data is transmitted from the client, it is received by a "front-end" at the broadcast operations center, where it is passed to a database server 147 that operates a database 149 in which the client demand feedback data is stored and processed. A typical front end may comprise one or more network or web servers 148 (see FIG. 4C), which have application code that is used to receive the client feedback data and route it to database server 147. In addition, various switches and firewalls may sit between the front-end and the database server (for clarity, the various components used in the front-ends of these systems are not shown in the Figures herein). In other implementations, database server 147 may be used directly for these front-end processes. In still other implementations, client demand feedback data may be sent to a local server, which in turns forwards the client demand feedback data to a database server operated by a broadcast operations center.

As discussed above, automatically-generated ratings may be derived from a combination of a user's previous viewing habits (i.e., in response to pieces of content that have are currently cached or have been previously cached), and previous ratings and classification provided by the user and through use of the relevance and believability factors. In some instances, data pertaining to a user's previous viewing habits may not be used due to privacy concerns. However, in order to overcome most privacy concerns, in one embodiment the client demand feedback data is sent back to the broadcast center through a mechanism that is guaranteed not to identify from which client and/or user that set of client demand feedback data was sent. For example, this "anonymous" client scheme could be implemented through an encryption process that uses a third party as a proxy, wherein the client demand feedback data is encrypted and must past through a decryption service operated by the third party that uses a private key that is not accessible to the broadcast operations center or any other party. The third party then forwards the client demand feedback data to the broadcast operations center. In this manner, there is no way for the broadcast operations center to tell from which client system a given set of client demand feedback data is received.

Figure 17:
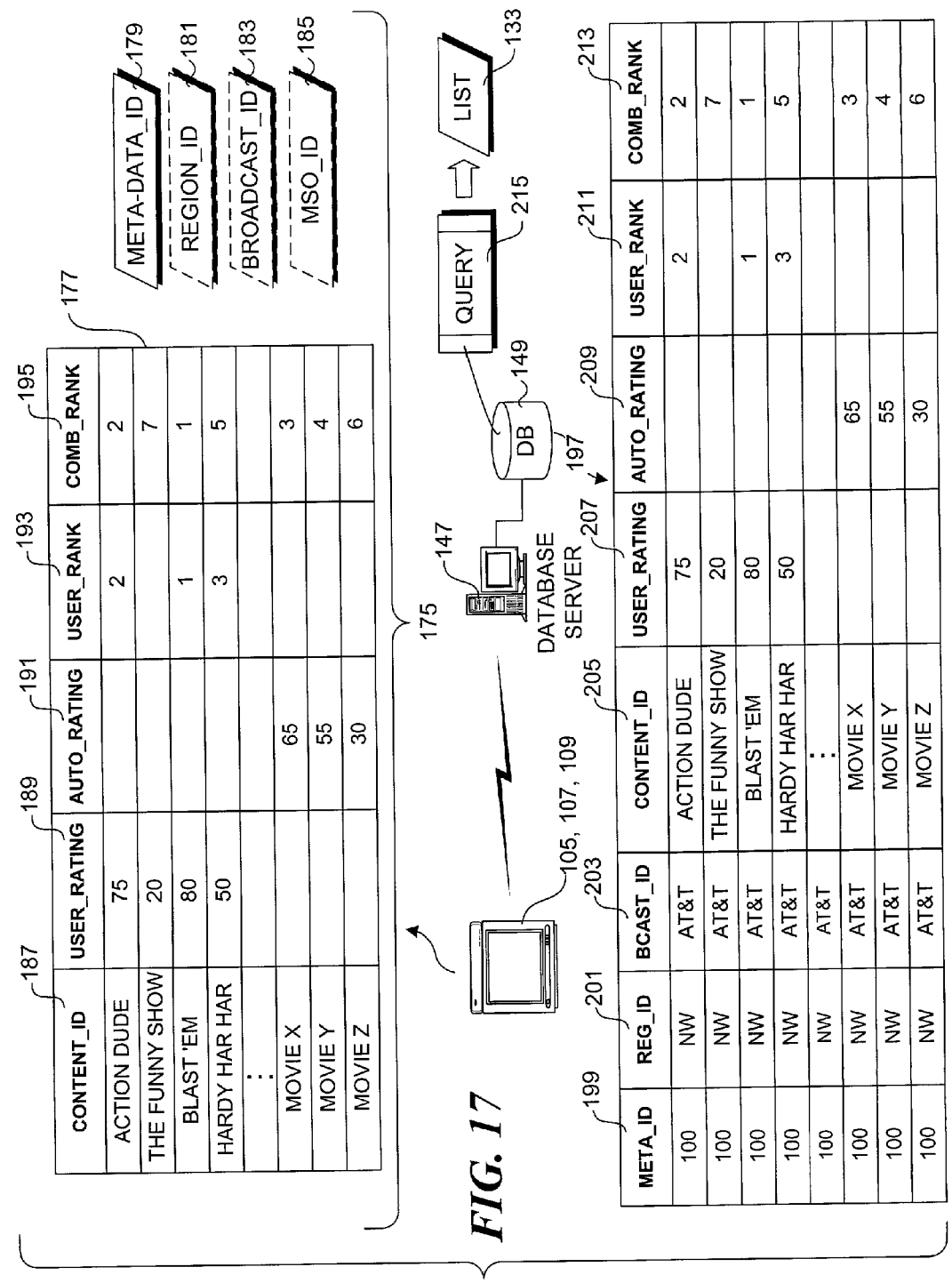
FIG. 17 is a schematic diagram illustrating exemplary configurations of a set of client demand feedback data as it is received from a client system and the same data after it is entered into a database.

A typical set of client demand feedback data 175 is shown in FIG. 17, which includes a content feedback demand table 177 in which user- and/or automatically-generated rating and/or relative rankings demand data are stored. In addition to this demand data, each set of client demand feedback data preferably will include a meta-data set identifier that is used by database 149 to organize its data such that only client demand feedback data that is relevant (i.e., client demand feedback data corresponding to a most-recent (current) set of meta-data) is used to determine broadcast schedule queue 133. For example, each set of meta-data that is broadcast may have a meta-data identifier 179 comprising a timestamp or sequential number to uniquely identify that set of meta-data, wherein the meta-data identifier is sent back with the data in content feedback demand table 177. When implementation in which client systems are segmented, client feedback data 175 preferably will include one or more corresponding segment identifiers, as depicted for illustrative purposes by a region identifier 181, a local broadcast system identifier 183, and an MSO identifier 185.

In general, the columns in the content feedback demand table may vary, depending on the type of feedback data provided by the various client systems. However, the content feedback demand table will always include a column that is used to identify the pieces of content for which the set of client demand feedback data pertains to. In the embodiment illustrated in FIG. 17, this column is depicted as a "CONTENT_ID" column 187, which contains a content identifier comprising a name for each piece of content for which the set of client demand feedback data applies. Preferably, each content identifier will comprise a unique combination of alphanumeric characters. In some instances, the list will include content identifiers for all of the pieces of content corresponding to a current set of meta-data, corresponding to a full set of client demand feedback data, while in other instances only a partial set of client demand feedback data will be received from a client system.

User-generated ratings corresponding to the various pieces of content are contained in a USER_RATING column 189, while automatically-generated ratings are contained in an "AUTO_RATING" column 191. In optional embodiments, the user and automatic ratings may be combined into a single column. In such embodiments, another column may be used to indicate which ratings were explicitly or implicitly generated. By providing this information, weighting values may be applied to the various rating data by database server 147. Optionally, the ratings data may already be weighted by one or more weighting algorithms employed by a client system.

In addition to the foregoing columns, a "USER_RANK" column 193 contains user-generated relative rankings, while a "COMB_RANK" column 195 contains a combination of user and automatically-generated relative rankings. In a manner similar to that discussed above, relative rankings data may be provided through use of a single column (e.g., the "COMB_RANK" column 195), with or without a separate column that identifies how the ranking for each piece of content was derived, or separate columns for the user and automatically-generated rankings.

It is noted that the client demand feedback data may include only rating data, only relative rankings data, or a combination of ratings and relative rankings data. Furthermore, each individual set of client demand feedback data may generally comprise data corresponding to a single content descriptor, a portion of the content descriptors provided in a current set of meta-data, or data corresponding to each of the content descriptors in the current set of meta-data. For ratings feedback, client systems may provide ratings feedback for individual content descriptors, wherein a given client system may provide a rating feedback in response to receiving a corresponding content descriptor via a broadcast of meta-data. For example, in one embodiment, all or a portion of the client systems will automatically generate a ratings feedback for each piece of content in response to receiving a content descriptor for the piece of content, whereupon the ratings feedback will be sent to the broadcast operations center and aggregated on an asynchronous basis. In the case of relative rankings data, at least two pieces of content will need to be ranked. In other embodiments, each set of client demand feedback data will include a "complete" set of feedback data, that is feedback data for each piece of content corresponding to the current set of meta-data.

As various client feedback demand data is received by the broadcast operations center, it is stored in database 149 by database server 147. In general, database server 147 will comprise a computer server running a relational database management system (RDBMS) server software package, such as the SQL-based RDBMS server products produced by Oracle (e.g., Oracle 8i enterprise edition), Microsoft (SQL Server 7), Informix, and Sybase. The foregoing database server products are designed to handle large transaction throughputs using multiple connections. In other implementations, a less-complex database server product may be used, such as Microsoft Access and Paradox. In some system configurations, the database server and the broadcast server may comprise a single machine. In other configurations, the database server and broadcast server will comprise separate machines.

Typically, the client feedback demand data will be stored in database 149 using one or more database tables, which collectively comprise a database "schema." For example, data corresponding to client demand feedback data 175 may be stored in a "demand data" table 197, which includes a "META_ID" column 199 in which the meta-data identifiers are stored, a "REG_ID" column 201 in which region identifiers are stored, a "BCAST_ID" column 203 in which broadcast identifiers are stored, and a "CONTENT_ID" column 205 in which the content identifiers are stored. Demand data table 197 further includes a "USER_RATING" column 207 in which user rating data is stored, an "AUTO_RATING column 209 in which automatically-generated ratings are stored, a "USER_RANK" column 211 in which user relative rankings are stored, and a "COMB_RANK" column 213 in which a combination of user- and automatically-generated relative rankings are stored.

Broadcast schedule queue 133 may be maintained by database server 147 or broadcast server 103, which will generally be derived by querying database 149. Typically, broadcast schedule queue 133 will comprise an ordered list of content identifiers corresponding to the pieced of content for the current set of meta-data, wherein the content identifiers are ordered from top to bottom list based on the relative demand for their corresponding piece of content, which is determined by aggregating the client demand feedback data provided by the client systems. Optionally, the ordered list may be adjusted based on other considerations, such as available broadcast bandwidth, contractual requirements with various broadcasters, etc.

In one embodiment, as each set of client feedback data is received by database server 147, the data is parsed, individual records corresponding to each piece of content having demand feedback data is entered in database 149, and the ordered list is automatically reordered based on the new set of data. For example, client demand feedback data may comprise a comma-delimited list or a set of XML data that is received by database server 147, converted into individual "rows," and inserted into "demand data" table 197. In response to being inserted, an "after insert" trigger for demand data table 197 could then be used to automatically run a query 215 that reorders the ordered list based on existing data in the demand data table 197 that references the meta-data identifier for the current set of meta-data. As a result, broadcast schedule queue 133 will be updated in response to each set of client demand feedback data that is received by the broadcast operations center.

Figure 18:
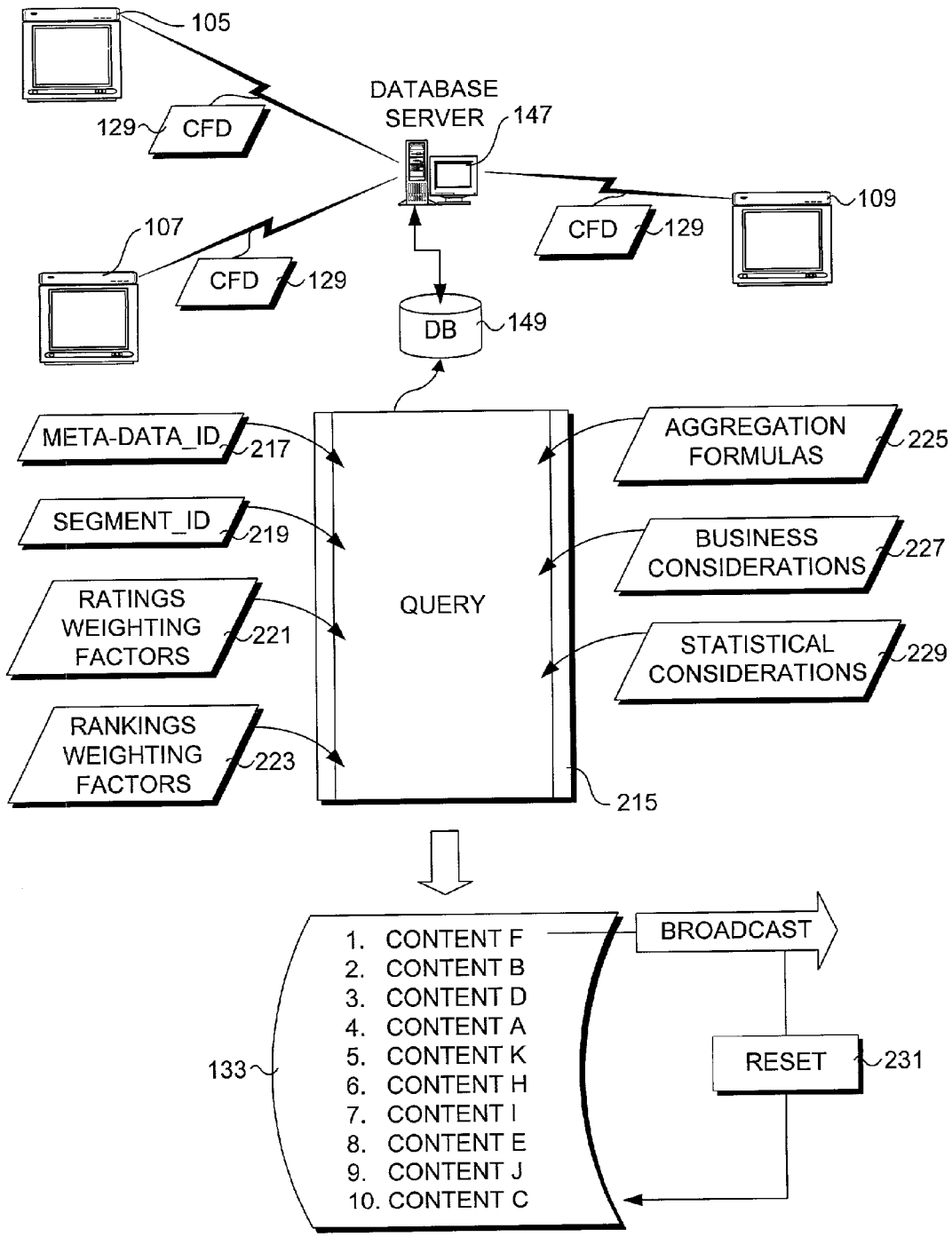
FIG. 18 is a schematic diagram illustrating a query process that is used to build an ordered list corresponding to a broadcast scheduling cue.

Further details of query 215 are shown in FIG. 18. In generally, query 215 generates an ordered list that is used for broadcast schedule queue 133 by aggregating various client feedback data 129 received from client systems 105, 107, and 109. As discussed above, these client demand feedback data are stored in one or more tables in database 149. In addition to these tables, database 149 may also include other tables that contain information used by query 215, such as revenue factors, meta-data, weighting factors, content attribute tables, segmentation tables, etc. In general, query 215 will be formulated from various inputs supplied by an application running on database server 147 or from broadcast server 103. These may typically include one or more of the following: a meta-data identifier 217 corresponding to a current set of meta-data; various segment identifiers 219 in cases where segmentation is used; ratings weighting factors 221; rankings weighting factors 223; aggregation formulas 225 (e.g., summing, averaging, maximum, etc); business considerations 227; and statistical considerations 229.

The particular query used to generate broadcast schedule queue 133 will depend on specific inputs provided by the broadcast operations center. For example, in one embodiment, ratings are used to determine the ordered list, wherein the pieces of content are ordered based on an aggregation of the ratings, such as an average rating or a statistical mean rating. In another embodiment, the relative rankings are used, and the ordered list is determined based on a predetermined ranking formula. For example, the following ranking formula, which is used for many rankings, such as a top 25 collegiate sports team ranking. For a current set of meta-data, a range of rankings is determined. For example, if the current set of meta-data contains content descriptors relating to 50 pieces of content and no manually- to automatically-generated ranking offset is used, client demand feedback data pertaining to those pieces of content will have ranking values from 1 to 50 (it is noted that while some pieces of content will not be ranked by a portion of the client systems, all pieces of content will be ranked by at least some client systems). Each ranking value will then be recalculated based on it deviation from the maximum ranking value plus 1. For example, in the present example the deviation will be taken from 51 whereby an original ranking of 1 will now have a value of 50, while an original ranking of 50 will now have a value of 1. The recalculated values are simply summed, with the pieces of content with the highest sums placed at the top of the ordered list.

The foregoing scheme enables more weight to be added to content that is ranked versus content that has not been ranked. For example, in some instances, a user will be more interested in ranking content the user is interested than ranking content the user is not interested in. Accordingly, pieces of content that have any rating at all will be considered to be in higher demand than pieces of content that have not been weighted. In contrast, in other instances, it will be determined that although a user may tend to rank particular content, the user typically does not cache this content when it is broadcast, but rather select to cache content that the user did not explicitly rank. In this case, more weight may be given to those automatically-ranked pieces of content. In other embodiments, a combination of ratings and rankings data may be used to determine the ordered list used for broadcast schedule queue 133.

As described above, various data processing functions such as the resealing and offsetting of rating data, weighting the data, etc., were performed on the client systems. In an optional embodiments, these functions may be performed by database server 147. For example, the client feedback data could be sent to correspond to a tabular format, wherein additional columns could be used to identify how the data values were generated, and then an insert query or sets of queries could be performed by database server 147 to rescale and offset rating data, apply different weighting factors to user- and automatically-generated client demand feedback data, etc.

As shown toward the bottom portion of FIG. 18 and discussed above, upon broadcast of each piece of content, the client demand data for that piece of content is reset in a block 231. In one embodiment, all records corresponding to the current set of meta-data and piece of content are deleted. In another embodiment, all data values for the current set of meta-data and the piece of content are nulled. In yet another embodiment, the meta-data identifier for all rows corresponding to the current set of meta-data and the piece of content is changed. The result of each of these reset processes is that the piece of content will fall to the bottom of broadcast schedule queue 133, and may only rise back up to the top of the queue in response to new client feedback demand data.

Statistical considerations 229 may be used in instances in which there is a limited amount of client demand feedback data for all or a portion of the pieces of content corresponding to a current set of meta-data. For instance, as described above, the client demand feedback data for a given piece of content is reset upon broadcasting that piece of content. This is to guarantee that the piece of content may not rise to the top of the ordered list until new client demand feedback data is received for the piece of content. If query 215 comprises averaging ratings data, it will generally be desirable to preclude that piece of content from rising back to the top of the ordered list until a sufficient number of client systems provide demand feedback data for that piece of content. For example, suppose a particular piece of content that has recently been broadcast is a new release of a major blockbuster movie that is in high demand. If the first ten sets of client feedback demand data concerning that piece of content rate it as a 100 (or other maximum value), that piece of content would normally move to the top of the ordered list. However, by using statistical considerations 229, such as requiring a minimum number client feedback demand data, the piece of content will not be considered until the minimum criteria is met.

Other query considerations include instances in which client demand feedback data corresponding to more than one set of meta-data is used to build the ordered list. In this case, the list of pieces of content will comprise all the different pieces of content described in the multiple sets of meta-data. Typically, as various pieces of content fall out of favor, they will be replaced by new pieces of content such that successive sets of meta-data may change. Generally, the changes in the list corresponding to pieces of content considered for broadcasting will change somewhat slowly, rather than a wholesale change being made to the list. For instance, if sets of meta-data correspond to 100 pieces of content, a new set of meta-data will typically include at least 80 or 90 pieces of content from the previous set rather than 20 or less. It is possible that when the ordered list only comprises pieces of content from a single (e.g., current) set of meta-data, there may be pieces of content that fall near the top of the ordered list, but are never broadcast because they never reach the top rung. By aggregating client demand feedback data over multiple sets of meta-data, such pieces of content may rise to the top of the ordered list, whereupon they will be broadcast. It is further noted in one embodiment that broadcast schedule queue 133 may comprise a single piece of content that is determined to be most opportunistic by query 215, wherein the query is repeated every time a new broadcast schedule needs to be generated.

Figure 19:
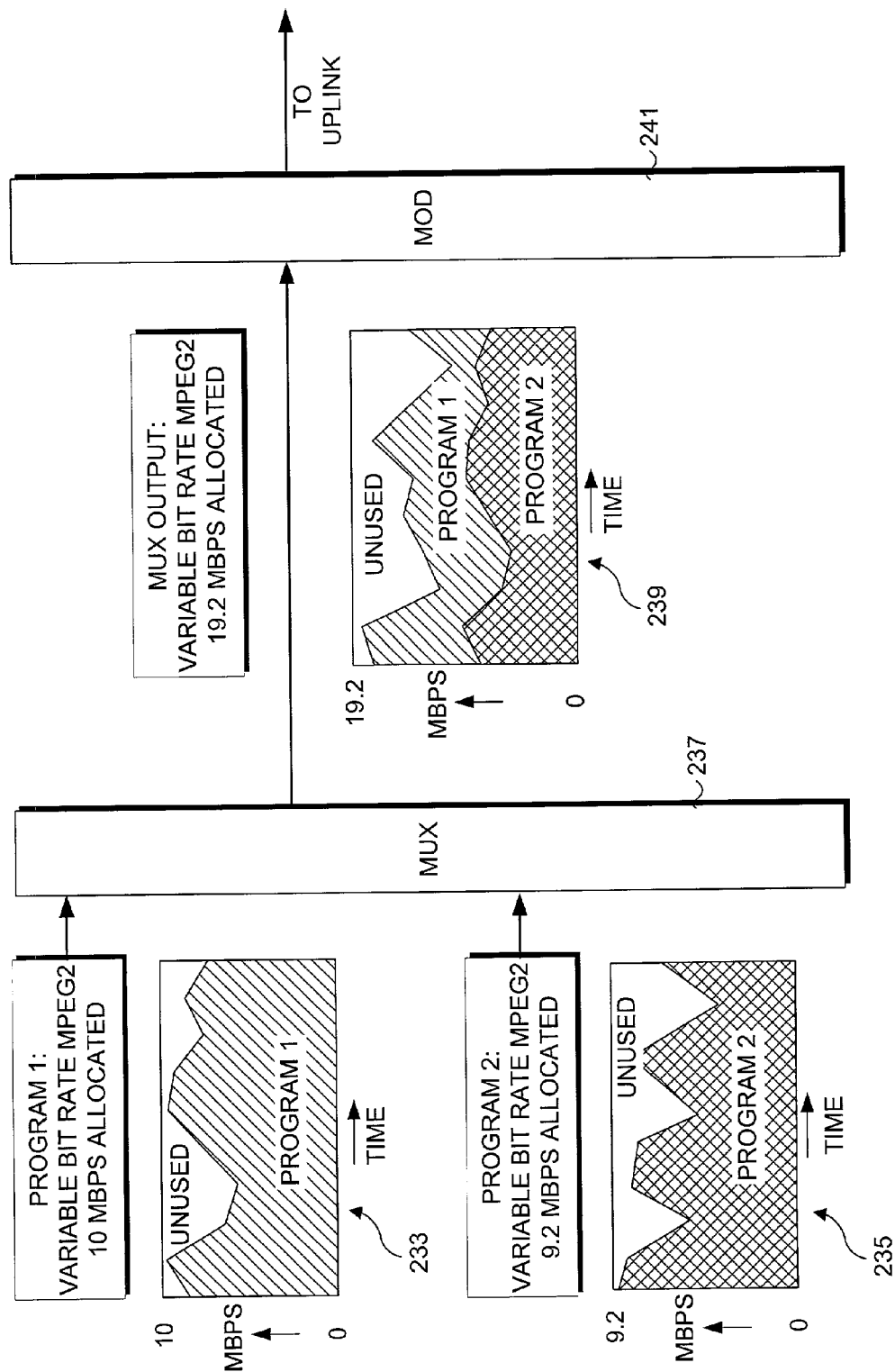
FIG. 19 is a schematic diagram illustrating a conventional method for broadcasting variable rate data streams.

The pieces of content, as well as the meta-data, may be broadcast using several different broadcast mechanisms. In one embodiment, a piece of content may be broadcast using a dedicated broadcast channel or a multiplexed set of channels. In another embodiment, a piece of content may be broadcast using post-multiplex insertion of null data packets. As shown in FIG. 19, under conventional broadcasting techniques a portion of the bandwidth is unused. In the illustrated example, a Program 1 comprises a variable bit rate MPEG2 data stream 233 that is allocated 10 megabits per second (Mbps)of bandwidth, while a Program 2 comprises a variable bit rate MPEG2 data stream 235 that is allocated 9.2 Mbps of bandwidth. Data streams 233 and 235 are fed into a multiplexor (MUX) 237, which multiplexes the two streams into a single combined data stream 239 having 19.2 Mbps of bandwidth. Combined data stream 239 is then modulated with a modulator 241 and set to a broadcast uplink (e.g., sent to a satellite).

As illustrated in FIG. 19, there is an unused portion (spectrum) of bandwidth for each of data streams 233 and 235, and an even larger unused portion for combined stream 239. This is due to the fact that when content is streamed using variable bit rate MPEG2 encoding (or other types of variable bit rate encoding), the amount of data corresponding to different portions of the content varies over time. For example, an action scene in a movie requires more data than a scene in which the characters and/or background are more static. Typically, under this consideration, the bandwidth for the data stream is selected to handle a predicted maximum bandwidth that will adequately handle higher data-rate scenes, which results in portions of the data streams that do not contain and data. When a packetized transport is used, these unused portions of bandwidth typically comprise "null" packets.

Figure 20:
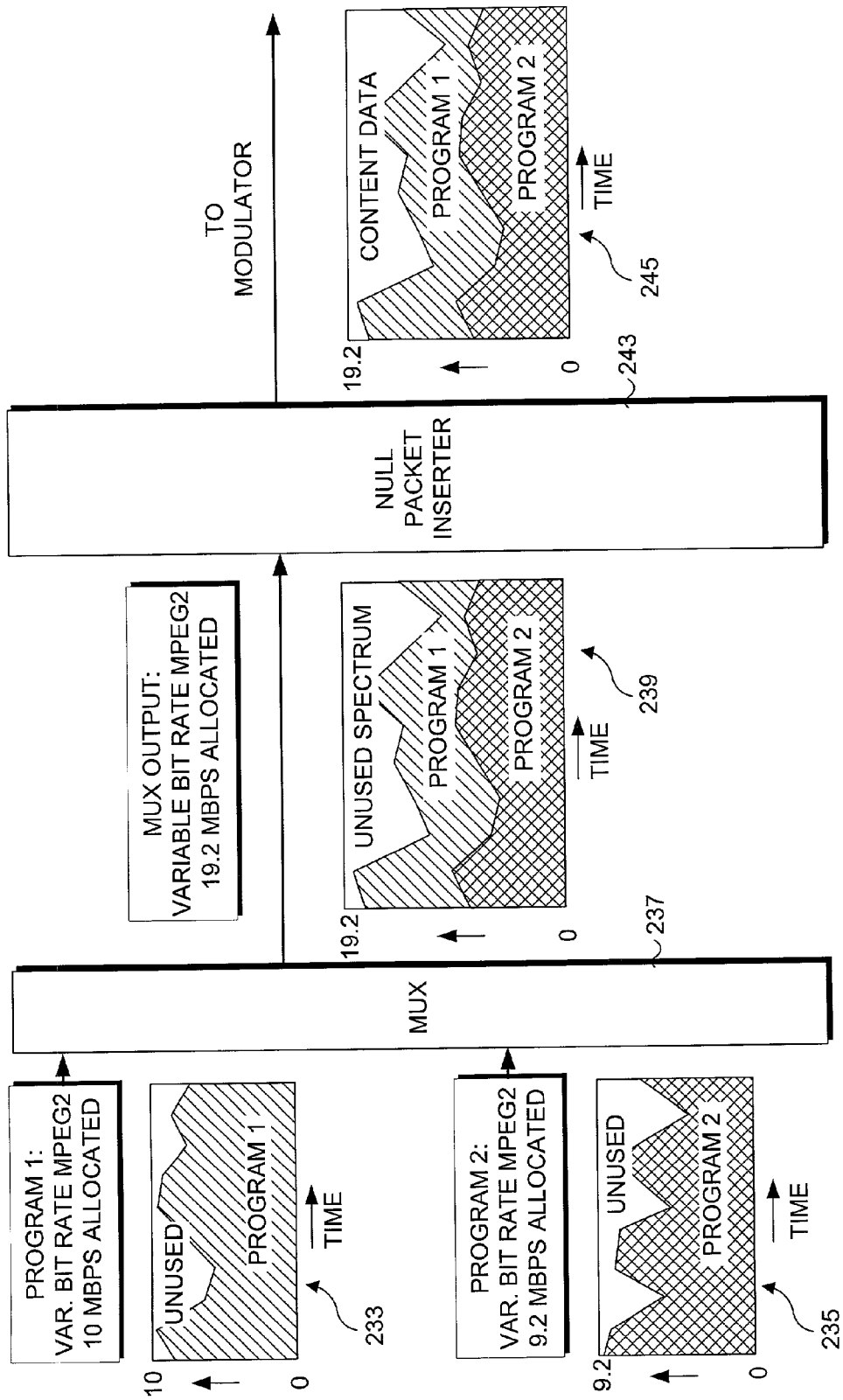
FIG. 20 is a schematic diagram illustrating the use of null packet insertion of data to fully utilize the bandwidth that unused in the convention broadcast of variable rate data streams in accordance with the teachings of the present invention.

The present invention provides a broadcast mechanisms that enables this previously unused bandwidth portion to carry broadcast data. As illustrated by one embodiment in FIG. 20, a null packet inserter 243 is used to insert data packets corresponding to a presently broadcast piece of content in place of the null packets in combined data stream 237, thereby creating a fully-used bandwidth data stream 245. Fully-used bandwidth data stream 245 is than forwarded to modulator 241, which modulates the data stream and sends it to the broadcast uplink in a manner similar to that discussed above with reference to FIG. 19.

It is noted that under most instances, the data rate corresponding to a broadcast of a piece of content does not need to match the data rate at which that content is played back. For example, suppose the piece of content is a movie. Under a conventional broadcast, data corresponding to the movie would be broadcast at a constant rate that is adapted for reception and playback of that broadcast by convention television receivers. This is because the received content is "played" as it is received, or in real-time. In contrast, many of the pieces of content that are broadcast under the teachings of the invention are to be viewed "on demand" at a point in time subsequent to when that broadcast is received and cached by a client system. As a result, the data rate used to broadcast the various pieces of content may vary over time, wherein the content may be delivered at significantly faster or slow rates than real-time broadcast data.

In accordance with the foregoing considerations, another method for sending the pieces of content is via a "batch" broadcast, wherein a batch of content is sent. This is advantageous for all digital broadcast systems, and is particularly useful when used with multi-stage broadcast networks where a store and forward mechanism may be used between different stages, as discussed above with reference to FIG. 16.

Figure 21:
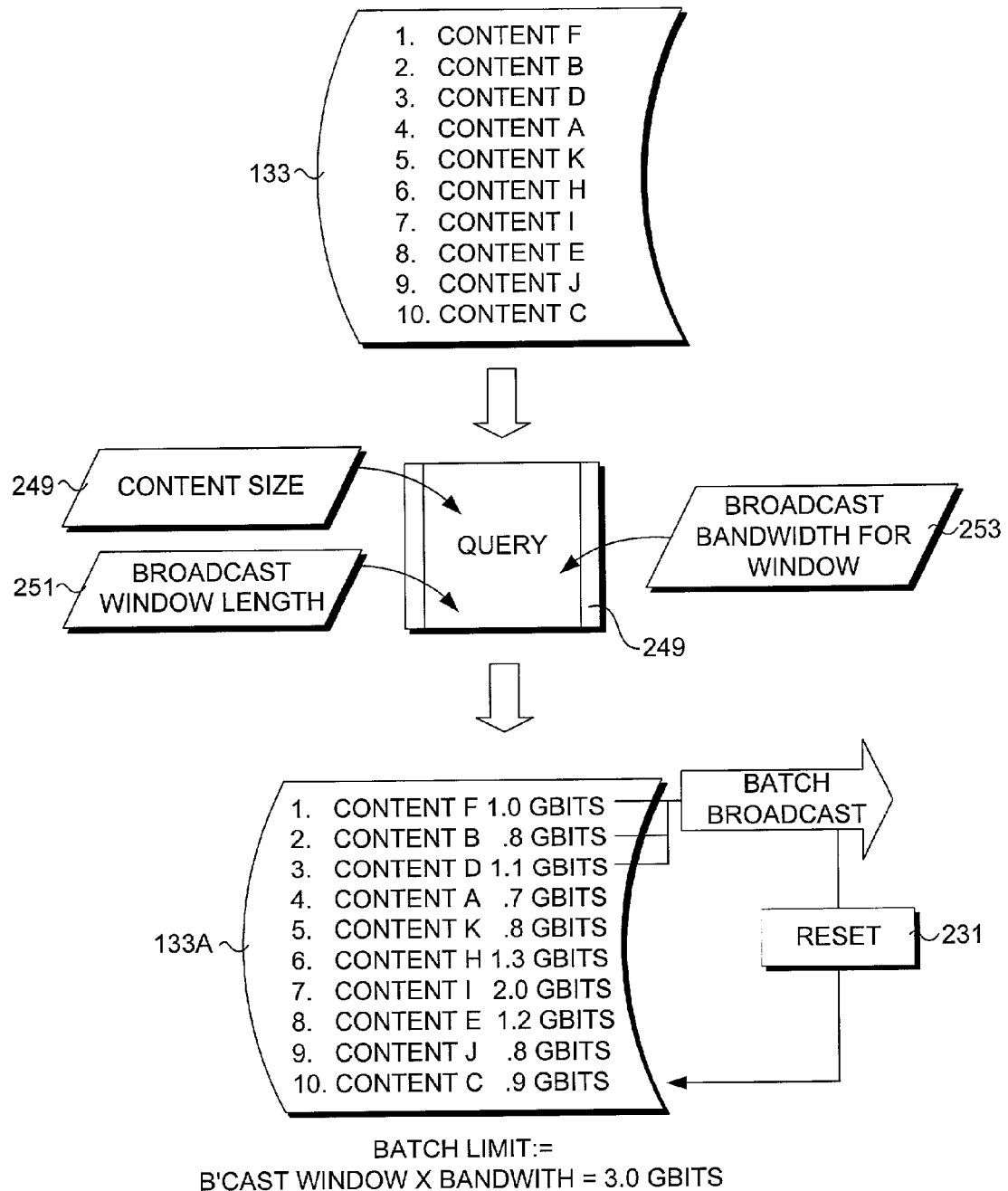
FIG. 21 is a block schematic diagram illustrating how pieces of content are selected during a batch processing embodiment in accordance with the teachings of the present invention.

One embodiment for broadcasting batches of content in accordance with the teachings of the invention is illustrated in FIG. 21. The process begins with an ordered list corresponding to broadcast schedule queue 133. A second query 247 is performed on the ordered list to determine one or more pieces of content that are scheduled to be broadcast during a next broadcast window. The pieces of content selected for a given batch of content will be based on the content size 249 of each piece of content, a broadcast window length 251, and a broadcast bandwidth 253. The pieces of content that fall at the top of an ordered list 133A are selected, in order, based on their respective size and the available space left in a batch limit that is determine by multiplying the broadcast window length times the broadcast bandwidth. Each next piece of content in ordered list 133A will be added as long as its size is less than or equal to the remaining space in the batch. If the size of a next piece of content exceeds the remaining space, the following piece of content will be considered for the batch of content to be broadcast. This process is repeated until the aggregated sizes of the selected pieces of content (approximately) fill the batch limit. Once the pieces of content for the batch are selected, those pieces of content are scheduled to be broadcast together in a batch during the next scheduled broadcast window. As before, upon broadcast of the batch of content, the client demand feedback data for each piece of content in the batch is reset in block 231.

Figure 22:
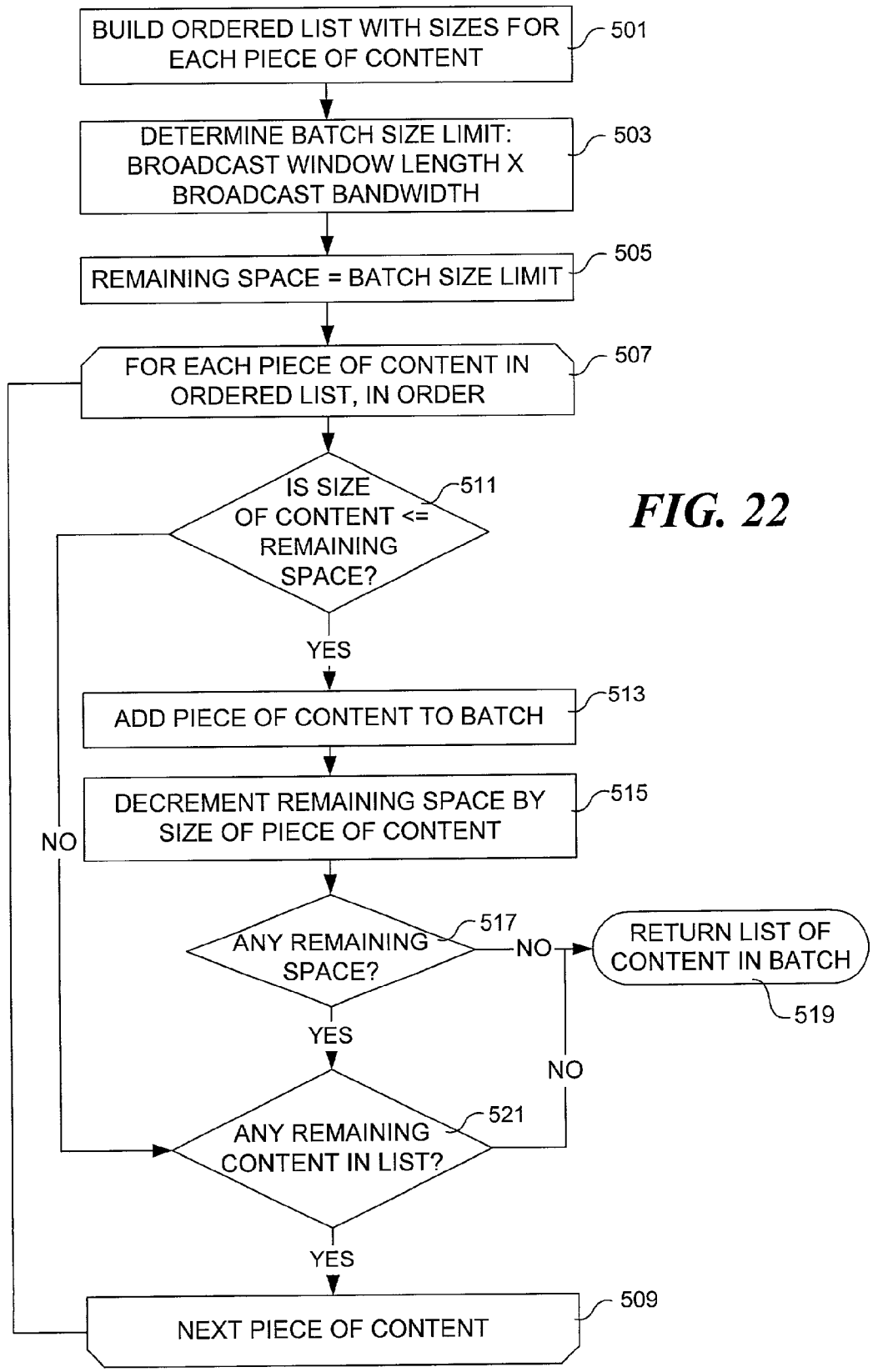
FIG. 22 is a flow diagram illustrating the logic used by the present invention when performing one embodiment of a batch content selection process.

With reference to FIG. 22, one embodiment of a process for determining which pieces of content make up a given batch of content begins in a block 501, wherein the ordered list of content is built that includes the size of each piece of content; as depicted by ordered list 133A in FIG. 21. As discussed above, ordered list 133A may be derived from ordered broadcast schedule queue 133 using query 247. However, as will be recognized by those skilled in the database arts, queries 215 and 247 can be combined into a single query to produce ordered list 133A.

Next, in a block 503, the batch size limit is determined. This is calculated by multiplying broadcast window 251 by the broadcast bandwidth for the window 253. The remaining space is then set equal to the batch size limit in a block 505. As depicted by start and end loop blocks 507 and 509, respectively, the following operations are performed for on one or more pieces of content in ordered list 133A, in order. First, in a decision block 511 a determination is made to whether the piece of content has a size that is less than or equal to the remaining space. If the answer is yes, the logic proceeds to a block 513 in which the piece of content is added to the batch, and a block 515 in which the remaining space is decremented by the size of the recently added piece of content. The logic then proceeds to a decision block 517, wherein a determination is made to whether there is any remaining space left. If the answer is no, a list of the pieces of content that have been added to the batch is returned in a return block 519. If the determination made in decision block 511 is false, blocks 513, 515, and 517 are skipped.

Next, in a decision block 512, a determination is made to whether there are any remaining pieces of content in the list to consider. If the answer is no, the logic proceeds to return block 519. If there are remaining pieces of content to consider, the logic loops back to start block 507 to begin the evaluation of the next piece of content. This processing loop is performed continuously until the logic exits through return block 519.

Figure 23:
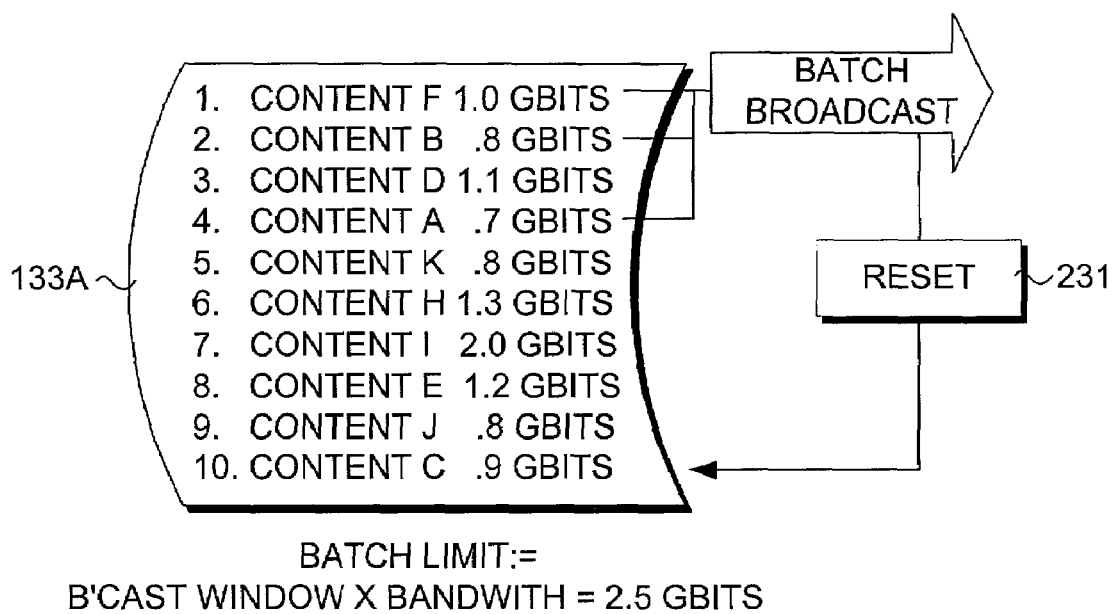
FIG. 23 is a schematic diagram illustrating in example in which a piece of content is skipped because it's size is greater than the remaining space for a given batch of content.

Examples of the results of the batch selection process are shown in FIGS. 21 and 23. For example, as depicted in FIG. 21, suppose that the broadcast window length is 1000 seconds and the broadcast bandwidth is 3 Mbps. The batch limit would than equal 3 gigabits, and the system will select the top 3 Gigabits worth of content from the top of ordered list 133A to content. In this instance, pieces of content F, B, and D are sent, which are determined in the following manner. Piece of content F is first considered since it is at the top of ordered list 133A. It has a size of 1.0 gigabits, which is less than the remaining space, which begins at the batch limit of 3 gigabits. The remaining space is then decremented by 1.0 gigabits so that it now equals 2 gigabits, and the next piece of content in ordered list 133A, content B, is considered. Content B has a size of 0.8 gigabits, which is less than the remaining space of 2 gigabits, so it is added to the batch and the remaining space is decremented by 0.8 gigabits so that it now equals 1.2 gigabits. Next, content C is considered, which has a size of 1.1 gigabits, which again is less than the remaining space, so it is added to the batch and the remaining space is decremented by 1.1 so that it now equals 0.1 gigabits. The remaining pieces of content are then considered, in order, to see if any of them have a size<=0.1 gigabits. Since none of them have this size, the batch of content, comprising content F, B, and D, is scheduled to be broadcast during the next broadcast window.

In FIG. 23 the batch limit has been reduced to 2.5 gigabits. Content F and B are added to the batch, as above, leaving 0.7 gigabits of remaining space. Next, content D is considered. However, in block 511 it is determined that the size of content D is larger than the remaining space, and so the logic loops back to evaluate content A. In this case, the answer to block 511 is true, and content A is added to the batch of content. Decision block 517 then determines that all of the remaining space has been used, and the logic returns Content F, B, and A for the batch in return block 519.

In one embodiment, a query is used to build ordered list 133A, wherein the query is incorporated into a cursor loop, which loops through the results of the query to select an appropriate set of pieces of content for the batch. In another embodiment, a somewhat more complex query may be used to select the appropriate set of pieces of content for the batch.

In the foregoing detailed description, the method and apparatus of the present invention have been described with reference to specific exemplary embodiments thereof It will, however, be evident that various modifications and changes may be made thereto without departing from the broader spirit and scope of the present invention. The present specification and figures are accordingly to be regarded as illustrative rather than restrictive.

What is claimed is:

1. A method for generating a broadcast schedule, comprising:

broadcasting meta-data to a plurality of client systems, the meta-data including descriptions of a plurality of pieces of content that are in consideration for upcoming broadcasts by a broadcast operations center but may or may not be included in an actual broadcast schedule to be generated;

receiving individual sets of client demand feedback data from at least a portion of said plurality of client systems, each individual set of client demand feedback data comprising data indicating a client interest level in at least a portion of the plurality of pieces of content;

maintaining a broadcast schedule queue comprising an ordered list of pieces of content that indicates relative levels of client interest in each piece of content that are derived from an aggregation of the client demand feedback data; and selecting a batch of content comprising one or more pieces of content from a top portion of the broadcast schedule queue to be broadcast during a next broadcast schedule window based on a size of said one or more pieces of content in combination with an available bandwidth for the next broadcast schedule window.

2. The method of claim 1, wherein the method is performed continuously such that a new batch of content is broadcast during sequential broadcast schedule windows.

3. The method of claim 1, further comprising resetting the client demand feedback data for each piece of content in the batch of content that is selected to be broadcast during a next broadcast schedule window in response to a broadcast of that batch of content such that the piece of content cannot be selected again for a subsequent broadcast until new client demand feedback data corresponding to that piece of content is received.

4. The method of claim 1, wherein the individual sets of client demand feedback data are received from respective client systems on an asynchronous basis and the broadcast schedule queue is recalculated upon receiving each individual set of client demand feedback data.

5. The method of claim 1, further comprising adjusting the broadcast schedule queue in consideration of business objectives.

6. The method of claim 1, wherein the client demand feedback data comprises ratings data corresponding to respective pieces of content, and wherein the pieces of content in the broadcast schedule queue are ordered based on corresponding relative rating values derived from an aggregation of the ratings data.

7. The method of claim 6, wherein the aggregation of the ratings data comprises calculating an average ratings value for each piece of content and the highest rated piece of content is the piece of content with the highest average rating value.

8. The method of claim 6, wherein at least a portion of the ratings data comprise rating inputs provided by users of the client systems, each rating input indicating a level of desirability of a given user to receive a corresponding piece of content.

9. The method of claim 6, wherein at least a portion of the ratings data is automatically generated by the client systems based on data stored on the client systems that are indicative of content preferences of users of those client systems.

10. The method of claim 6, further comprises adjusting ratings data corresponding to any pieces of content that are rated by a given client system in consideration of a revenue-generating potential for those pieces of content.

11. The method of claim 6, wherein, for each individual set of client demand feedback data received from a client system, a first portion of the ratings data comprises rating inputs provided by one or more users of that client system and a second portion of the ratings data are automatically generated by that client system based on data stored on that client system that are indicative of content preferences of said one or more users of that client system.

12. The method of claim 6, wherein the meta-data is broadcast as a continuous stream and includes a content descriptor for each piece of content comprising a set of attributes and attribute values that are used to describe that piece of content, and further wherein at least a portion of the client systems provide ratings data corresponding to an individual piece of content in response to receiving the content descriptor for that piece of content.

13. The method of claim 1, wherein at least a portion of the individual sets of client demand feedback data comprise relative rankings data pertaining to relative levels of interest in at least two pieces of content, and the broadcast schedule queue is determined, at least in part, by aggregating the relative rankings data.

14. The method of claim 13, wherein the aggregation of the relative rankings data comprises calculating an average ranking value for each piece of content among said plurality of pieces of content and wherein the ordered list reflects the relative average ranking values of corresponding pieces of content.

15. The method of claim 13, wherein at least a portion of the relative rankings data comprise individual sets of relative ranking inputs provided by users of the client systems, each individual set of relative ranking inputs comprising a relative ranking of at least two pieces of content, wherein the relative ranking is indicative of a relative level of desirability of a given user of a respective client system to receive a broadcast of the pieces of content ranked by that user.

16. The method of claim 13, wherein at least a portion of the relative rankings data is automatically generated by the client systems based on data stored on the client systems that are indicative of content preferences of users of the client systems.

17. The method of claim 13, further comprises adjusting relative rankings data corresponding to pieces of content that are rated by a given client system in consideration of a revenue-generating potential for those pieces of content.

18. The method of claim 13, wherein, for each individual set of client demand feedback data among at least a portion of the individual sets of client demand feedback data comprising relative rankings data, a first portion of the relative rankings data comprises relative ranking inputs provided by one or more users of the client system from which that individual set of client feedback is received and a second portion of the relative rankings data are automatically generated by that client system based on data stored on that client system that are indicative of content preferences of said one or more users of that client system.

19. The method of claim 13, wherein a current set of meta-data corresponding to a set of pieces of content considered for an upcoming broadcast is broadcast as a continuous stream that is repeated and includes a respective content descriptor for each piece of content included in the set of pieces of content, and wherein at least a portion of the individual sets of client demand feedback data includes a ranked list expressing a relative interest in all of the pieces of content in the set of pieces of content.

20. The method of claim 1 further comprising broadcasting a broadcast schedule prior to broadcasting the batch of content that is selected to be broadcast during the next broadcast schedule window.

21. The method of claim 1, wherein the plurality of client systems are segmented such that each client system is a member of a particular segment among multiple segments and each individual set of client feedback data includes data that identifies the segment the client system is a member of, and further wherein one or more pieces of content are selected to be broadcast during the next broadcast schedule window for each segment.

22. The method of claim 21, wherein the plurality of client systems are segmented based on geography such that each client is assigned to a geographical region.

23. The method of claim 21, wherein the plurality of client systems are segmented based on a network by which each client receives broadcast content.

24. The method of claim 1, further comprising broadcasting the batch of content using a multi-stage broadcast network.

25. The method of claim 24, wherein the multi-stage broadcast network uses a store and forward mechanism in which broadcast data is stored and forwarded between different stages.

26. An apparatus, comprising:
a processor having circuitry to execute instructions;
a communications interface coupled to the processor to receive data from the one or more client systems;
a storage device coupled to the processor, having sequences of instructions stored therein, which when executed by the processor cause the apparatus to
receive individual sets of client demand feedback data from a plurality of client systems, each individual set of client demand feedback data generated in response to meta-data that is broadcast to the plurality of client systems, the meta-data including descriptions of a plurality of pieces of content that are in consideration for upcoming broadcasts but may or may not be included in an actual broadcast, each individual set of client demand feedback data indicating a client interest level in at least a portion of the plurality of pieces of content;
maintain a broadcast schedule queue comprising an ordered list of pieces of content that indicates relative levels of client interest in each piece of content that are derived from an aggregation of the client demand feedback data; and select a batch of content comprising one or more pieces of content from a top portion of the broadcast schedule queue to be broadcast during a next broadcast schedule window based on a size of said one or more pieces of content in combination with an available bandwidth for the next broadcast schedule window.

27. The apparatus of claim 26, wherein the client demand feedback data for each piece of content in the batch of content that is selected to be broadcast during a next broadcast schedule window is reset in response to a broadcast of that batch of content such that the piece of content cannot be selected again for a subsequent broadcast until new client demand feedback data corresponding to that piece of content is received and the broadcast scheduling queue is updated continuously such that a new batch of content is broadcast during sequential broadcast schedule windows.

28. The apparatus of claim 27, wherein the individual sets of client demand feedback data are received from respective client systems on an asynchronous basis and the broadcast schedule queue is recalculated upon receiving each individual set of client demand feedback data.

29. The apparatus of claim 26, wherein the client demand feedback data comprises ratings data corresponding to respective pieces of content, and wherein the pieces of content in the broadcast schedule queue are ordered based on corresponding relative rating values derived from an aggregation of the ratings data.

30. The apparatus of claim 29, wherein, for at least a portion of the individual sets of client demand feedback data received from the client systems, a first portion of the ratings data comprises rating inputs provided by one or more users of the client system from which that individual set of client demand feedback data is received and a second portion of the ratings data are automatically generated by that client system based on data stored on that client system that are indicative of content preferences of said one or more users of that client system.

31. The apparatus of claim 29, wherein the meta-data is broadcast as a continuous stream and includes a content descriptor for each piece of content comprising a set of attributes and attribute values that are used to describe that piece of content, and further wherein at least a portion of the client systems provide ratings data corresponding to an individual piece of content in response to receiving the content descriptor for that piece of content.

32. The apparatus of claim 26, wherein at least a portion of the individual sets of client demand feedback data comprise relative rankings data pertaining to relative levels of interest in at least two pieces of content, and wherein broadcast schedule queue is determined, at least in part, by aggregating the relative rankings data.

33. The apparatus of claim 32, wherein, for each individual set of client demand feedback data among at least a portion of the individual sets of client demand feedback data comprising relative rankings data, a first portion of the relative rankings data comprises relative ranking inputs provided by one or more users of the client system from which that individual set of client feedback is received and a second portion of the relative rankings data are automatically generated by that client system based on data stored on that client system that are indicative of content preferences of said one or more users of that client system.

34. The apparatus of claim 32, wherein a current set of meta-data corresponding to a set of pieces of content considered for an upcoming broadcast is broadcast as a continuous stream that is repeated and includes a respective content descriptor for each piece of content included in the set of pieces of content, and wherein at least a portion of the individual sets of client demand feedback data includes a ranked list expressing a relative interest in all of the pieces of content in the set of pieces of content.

35. A machine-readable medium having a plurality of machine-executable instructions stored thereon, which when executed by a machine cause the machine to:

receive individual sets of client demand feedback data from a plurality of client systems, the individual sets of client demand feedback data generated in response to meta-data that is broadcast to the plurality of client systems, the meta-data including descriptions of a plurality of pieces of content that are in consideration for a upcoming broadcast but may or may not be included in an actual broadcast, each individual set of client demand feedback data indicating a client interest level in at least a portion of the plurality of pieces of content;

maintain a broadcast schedule queue comprising an ordered list of pieces of content that indicates relative levels of client interest in each piece of content that are derived from an aggregation of the client demand feedback data; and select a batch of content comprising one or more pieces of content from a top portion of the broadcast schedule queue to be broadcast during a next broadcast schedule window based on a size of said one or more pieces of content in combination with an available bandwidth for the next broadcast schedule window.

36. The machine-readable medium of claim 35, wherein execution of the plurality of machine instructions cause the machine to reset the client demand feedback data for each piece of content in the batch of content that is selected to be broadcast during a next broadcast schedule window in response to a broadcast of that batch of content such that the piece of content cannot be selected again for a subsequent broadcast until new client demand feedback data corresponding to that piece of content is received, and the broadcast scheduling queue is updated continuously such that a new batch of content is broadcast during sequential broadcast schedule windows.

37. The machine-readable media of claim 36, wherein the individual sets of client demand feedback data are received from respective client systems on an asynchronous basis and the broadcast schedule queue is recalculated upon receiving each individual set of client demand feedback data.

38. The machine-readable media of claim 35, wherein the client demand feedback data comprises ratings data corresponding to respective pieces of content, and wherein the pieces of content in the broadcast schedule queue are ordered based on corresponding relative rating values derived from an aggregation of the ratings data.

39. The machine-readable media of claim 38, wherein, for at least a portion of the individual sets of client demand feedback data received from the client systems, a first portion of the ratings data comprises rating inputs provided by one or more users of the client system from which that individual set of client demand feedback data is received and a second portion of the ratings data are automatically generated by that client system based on data stored on that client system that are indicative of content preferences of said one or more users of that client system.

40. The machine-readable medium of claim 38, wherein the meta-data is broadcast as a continuous stream and includes a content descriptor for each piece of content comprising a set of attributes and attribute values that are used to describe that piece of content, and further wherein at least a portion of the client systems provide ratings data corresponding to an individual piece of content in response to receiving the content descriptor for that piece of content.

41. The machine-readable medium of claim 35, wherein at least a portion of the individual sets of client demand feedback data comprise relative rankings data pertaining to relative levels of interest in at least two pieces of content, and wherein broadcast schedule queue is determined, at least in part, by aggregating the relative rankings data.

42. The machine-readable medium of claim 41, wherein, for each individual set of client demand feedback data among at least a portion of the individual sets of client demand feedback data comprising relative rankings data, a first portion of the relative rankings data comprises relative ranking inputs provided by one or more users of the client system from which that individual set of client feedback is received and a second portion of the relative rankings data are automatically generated by that client system based on data stored on that client system that are indicative of content preferences of said one or more users of that client system.

43. The machine-readable medium of 41, wherein a current set of meta-data corresponding to a set of pieces of content considered for an upcoming broadcast is broadcast as a continuous stream that is repeated and includes a respective content descriptor for each piece of content included in the set of pieces of content, and wherein at least a portion of the individual sets of client demand feedback data includes a ranked list expressing a relative interest in all of the pieces of content in the set of pieces of content.

44. A system, comprising:
a broadcast server;
a database server, linked in communication with the broadcast server; and
a plurality of client systems linked in communication with the broadcast server via a first communications link and linked in communication with the database server via a second communication link;
wherein the broadcast server is programmed to broadcast meta-data to said plurality of client systems via the first communications link, the meta-data including descriptions of a plurality of pieces of content that are considered for an upcoming broadcast but may or may not be included in an actual broadcast schedule to be generated;
wherein each of said plurality of client systems is programmed to generate an individual set of client demand feedback data indicating a client interest level in at least a portion of the plurality of pieces of content based, in part, on the descriptions of such provided by the meta-data;
wherein at least a portion of the plurality of client systems send individual sets of client demand feedback data to the database server via the second communications link;
wherein the database server is programmed to maintain a broadcast schedule queue comprising an ordered list of pieces of content that indicates relative levels of client interest in each piece of content that are derived from an aggregation of the client demand feedback data; and
wherein at least one of the broadcast server and database server is programmed to select a batch of content comprising one or more pieces of content from a top portion of the broadcast schedule queue to be broadcast during a next broadcast schedule window based on a size of said one or more pieces of content in combination with an available bandwidth for the next broadcast schedule window.

45. The system of claim 44, wherein the one of the database server is programmed to reset the client demand feedback data for each piece of content in the batch of content that is selected to be broadcast during a next broadcast schedule window in response to a broadcast of that batch of content such that the piece of content cannot be selected again for a subsequent broadcast until new client demand feedback data corresponding to that piece of content is received, and the broadcast scheduling queue is updated continuously such that a new batch of content is broadcast during sequential broadcast schedule windows.

46. The system of claim 45, wherein the individual sets of client demand feedback data are received from respective client systems on an asynchronous basis and the broadcast schedule queue is recalculated by the database server upon receiving each individual set of client demand feedback data.

47. The system of claim 44, wherein the client demand feedback data comprises ratings data corresponding to respective pieces of content, and wherein the pieces of content in the broadcast schedule queue are ordered based on corresponding relative rating values derived from an aggregation of the ratings data.

48. The system of claim 47, wherein, for at least a portion of the individual sets of client demand feedback data received from the client systems, a first portion of the ratings data comprises rating inputs provided by one or more users of the client system from which that individual set of client demand feedback data is received and a second portion of the ratings data are automatically generated by that client system based on data stored on that client system that are indicative of content preferences of said one or more users of that client system.

49. The system of claim 47, wherein the meta-data is broadcast as a continuous stream and includes a content descriptor for each piece of content comprising a set of attributes and attribute values that are used to describe that piece of content, and further wherein at least a portion of the client systems provide ratings data corresponding to an individual piece of content in response to receiving the content descriptor for that piece of content.

50. The system of claim 44, wherein at least a portion of the individual sets of client demand feedback data comprise relative rankings data pertaining to relative levels of interest in at least two pieces of content, and wherein broadcast schedule queue is determined, at least in part, by aggregating the relative rankings data.

51. The system of claim 50, wherein, for each individual set of client demand feedback data among at least a portion of the individual sets of client demand feedback data comprising relative rankings data, a first portion of the relative rankings data comprises relative ranking inputs provided by one or more users of the client system from which that individual set of client feedback is received and a second portion of the relative rankings data are automatically generated by that client system based on data stored on that client system that are indicative of content preferences of said one or more users of that client system.

52. The system of claim 50, wherein a current set of meta-data corresponding to a set of pieces of content considered for an upcoming broadcast is broadcast as a continuous stream that is repeated and includes a respective content descriptor for each piece of content included in the set of pieces of content, and wherein at least a portion of the individual sets of client demand feedback data includes a ranked list expressing a relative interest in all of the pieces of content in the set of pieces of content.

53. The system of claim 44, wherein the first communication link comprises a satellite broadcast link and the second communication link comprises a telecommunications link.

54. The system of claim 44, wherein the first communication link and second communications link comprise a bi-directional cable system link.

55. The system of claim 44, wherein the first communication link comprises a satellite broadcast link and the second communication link comprises a computer network communications link.

56. The system of claim 44, wherein the first communication link and the second communications link comprise computer network communications links.

* * * * *